(12) United States Patent
Coste et al.

(10) Patent No.: US 8,687,460 B2
(45) Date of Patent: *Apr. 1, 2014

(54) METHODS AND APPARATUS OF SOURCE CONTROL FOR SYNCHRONIZED FIRING OF AIR GUN ARRAYS WITH RECEIVERS IN A WELL BORE IN BOREHOLE SEISMIC

(75) Inventors: Emmanuel Coste, Tokyo (JP); John Richard Tulett, Kanagawa-ken (JP); Hiroshi Nomura, Kanagawa-ken (JP); James Edward Martin, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 1404 days.

This patent is subject to a terminal disclaimer.

(21) Appl. No.: 12/048,201

(22) Filed: Mar. 13, 2008

(65) Prior Publication Data

US 2008/0205191 A1    Aug. 28, 2008

Related U.S. Application Data

(63) Continuation-in-part of application No. 10/439,904, filed on May 16, 2003, now Pat. No. 7,359,282.

(51) Int. Cl.
*G01V 1/38* (2006.01)

(52) U.S. Cl.
USPC .................. 367/15; 367/23; 367/25; 181/110

(58) Field of Classification Search
USPC ......... 166/66, 206, 250.1, 292, 300; 181/102, 181/107, 112; 367/13, 15, 19, 20, 21, 38, 367/50, 57, 58, 76, 79; 455/100; 702/13, 702/14, 16, 17
See application file for complete search history.

(56) References Cited

U.S. PATENT DOCUMENTS

| | | | |
|---|---|---|---|
| 4,210,897 A | 7/1980 | Hutchins |
| 4,300,653 A | 11/1981 | Cao et al. |
| 4,476,553 A | 10/1984 | Ziolkowski et al. |
| 4,660,184 A | 4/1987 | Haukjem et al. |
| 4,674,068 A | 6/1987 | Carruth, Jr. |
| 4,721,180 A | 1/1988 | Haughland |

(Continued)

FOREIGN PATENT DOCUMENTS

| | | |
|---|---|---|
| EP | 0400769 | 12/1990 |
| FR | 2588968 | 4/1987 |

(Continued)

OTHER PUBLICATIONS

Definition of "synchronize" from dictionary.com, downloaded Dec. 5, 2011 as http://dictionary.reference.com/browse/synchronize.*

(Continued)

*Primary Examiner* — Isam Alsomiri
*Assistant Examiner* — Daniel L Murphy
(74) *Attorney, Agent, or Firm* — Daryl R. Wright; Jody DeStefanis

(57) ABSTRACT

Methods and apparatus for generating borehole seismic surveys are disclosed. The methods and apparatus enable more accurate surveys than previous surveying systems. In some embodiments, firing of remote seismic sources is synchronized with data recording in a borehole. In some embodiments, the synchronization is based on a universal time standard. In some embodiments, GPS positioning technology is used to predict firing times and synchronize firing times with downhole and surface recording.

24 Claims, 29 Drawing Sheets

(56) References Cited

U.S. PATENT DOCUMENTS

| | | | |
|---|---|---|---|
| 4,757,482 A | 7/1988 | Fiske, Jr. | |
| H0000656 H | 7/1989 | Huizer et al. | |
| 4,868,794 A | 9/1989 | Ziolkowski et al. | |
| 4,893,285 A | 1/1990 | Masson et al. | |
| 4,894,807 A | 1/1990 | Alam et al. | |
| 5,184,329 A | 2/1993 | Regnault et al. | |
| 5,200,927 A | 4/1993 | Cretin et al. | |
| 5,524,709 A * | 6/1996 | Withers | 166/250.1 |
| 5,548,562 A | 8/1996 | Helgerud et al. | |
| 5,555,220 A | 9/1996 | Minto | |
| 5,581,415 A | 12/1996 | Graffenried | |
| 5,600,318 A | 2/1997 | Li | |
| 5,724,241 A | 3/1998 | Wood et al. | |
| 5,724,308 A | 3/1998 | Sorrells et al. | |
| 5,822,273 A | 10/1998 | Bary | |
| 5,920,828 A | 7/1999 | Norris et al. | |
| 5,940,778 A * | 8/1999 | Marfurt et al. | 702/16 |
| 5,978,313 A * | 11/1999 | Longaker | 367/38 |
| 5,995,905 A | 11/1999 | Ikelle | |
| 6,002,339 A * | 12/1999 | Norris | 340/690 |
| 6,026,056 A | 2/2000 | Lunde et al. | |
| 6,044,038 A | 3/2000 | Allensworth | |
| 6,091,668 A | 7/2000 | Barber | |
| 6,188,962 B1 | 2/2001 | Morgan et al. | |
| 6,301,193 B1 | 10/2001 | Martin et al. | |
| 6,630,890 B1 | 10/2003 | Endo et al. | |
| 6,788,618 B2 | 9/2004 | Clayton et al. | |
| 6,873,571 B2 | 3/2005 | Clayton et al. | |
| 7,359,282 B2 | 4/2008 | Tulett | |
| 7,974,150 B2 * | 7/2011 | Tulett et al. | 367/15 |
| 2001/0030076 A1 * | 10/2001 | Paulsson | 181/102 |
| 2002/0132594 A1 * | 9/2002 | Douma | 455/100 |
| 2003/0117893 A1 | 6/2003 | Bary | |
| 2003/0192692 A1 | 10/2003 | Tubel | |
| 2003/0202423 A1 | 10/2003 | Clayton et al. | |
| 2004/0006430 A1 | 1/2004 | Harmon et al. | |
| 2004/0136266 A1 | 7/2004 | Howlid et al. | |
| 2004/0228214 A1 | 11/2004 | Tulett | |

FOREIGN PATENT DOCUMENTS

| | | |
|---|---|---|
| GB | 2029016 | 3/1980 |
| GB | 2172997 | 10/1986 |
| GB | 2320327 | 6/1998 |
| GB | 2379741 | 3/2003 |
| JP | 11-063984 | 3/1999 |
| WO | 01/71385 | 9/2001 |
| WO | 01/75481 | 10/2001 |
| WO | 03/067201 | 8/2003 |
| WO | 03/067283 | 8/2003 |
| WO | 2004/102223 | 11/2004 |
| WO | 2006/040642 | 4/2006 |
| WO | 2007/056278 | 5/2007 |

OTHER PUBLICATIONS

Proxim Wireless, "Technology Overview." 2002.

J-F. Hopperstad, P. Vermeer, "An azimuth-invariant source array", SEG Int'l Exposition and Annual Meeting, San Antonio, Texas, Sep. 9-14, 2001.

Brice, Larsen, Morice, Svendsen and Ozbek, "Perturbations in 4D Marine Seismic," Preview: Australian Society of Exploration Geophysicists, Feb. 1996.

* cited by examiner

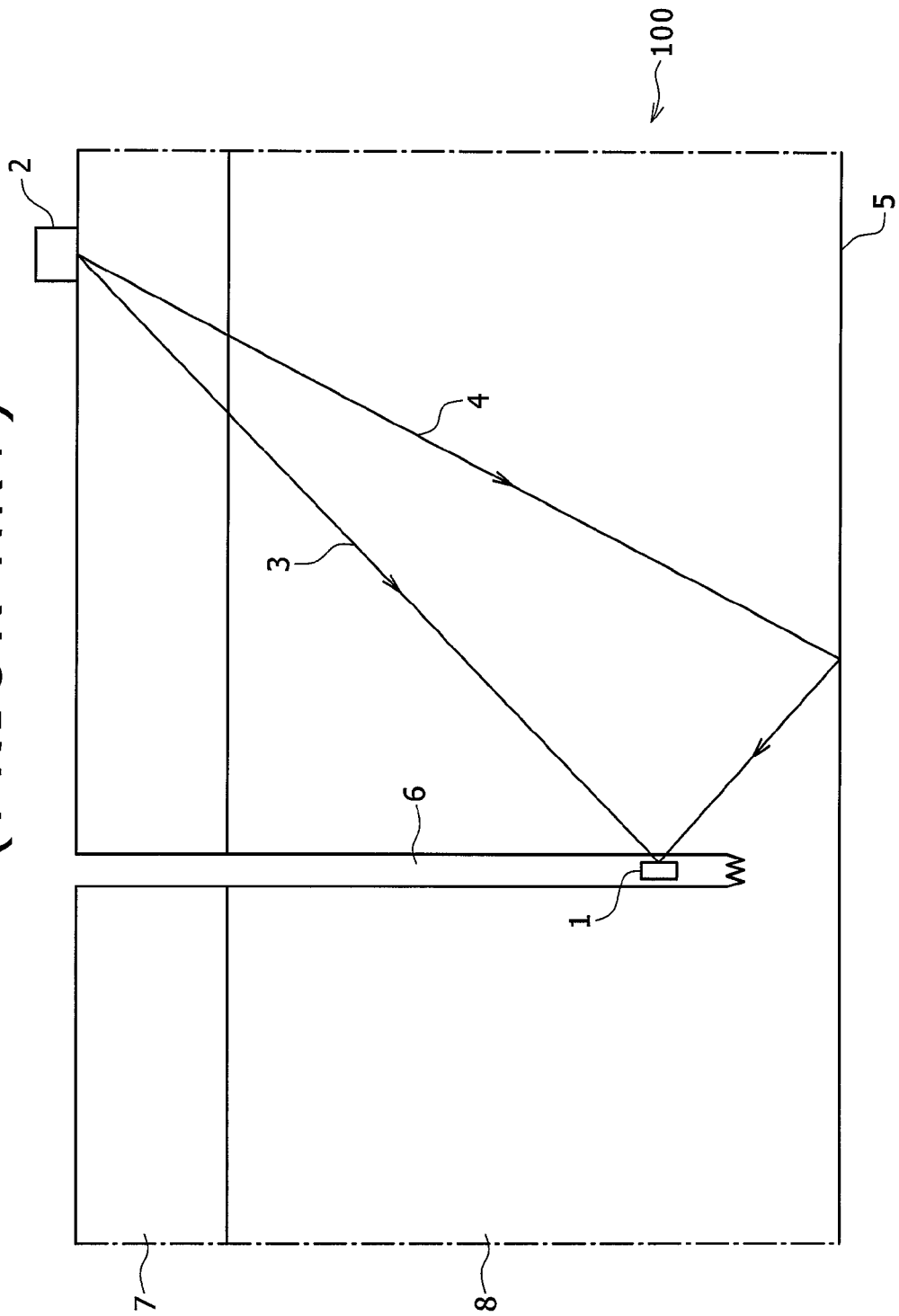

METHODS AND APPARATUS OF SOURCE CONTROL FOR SYNCHRONIZED FIRING OF AIR GUN ARRAYS WITH RECEIVERS IN A WELL BORE IN BOREHOLE SEISMIC

RELATED APPLICATIONS

This is a continuation-in-part of U.S. patent application Ser. No. 10/439,904 filed 16 May 2003 and entitled "Methods and Apparatus of Source Control for Borehole Seismic." This is also a continuation-in-part of U.S. patent application Ser. No. 10/965,045 filed 14 Oct. 2004 and entitled "Seismic Source Controller and Display System" and a continuation-in-part of U.S. patent application Ser. No. 11/552,970 filed 26 Oct. 2006 and entitled "Methods and Apparatus of Source Control for Sequential Firing of Staggered Air Gun Arrays in Borehole Seismic."

FIELD

The present invention relates generally to methods and apparatus for exploring subsurface formations. More particularly, the present invention relates to methods and apparatus for generating borehole seismic surveys.

BACKGROUND

Subsurface formation analysis has enabled more efficient oil and gas recovery over the past several decades. In recent years, petroleum exploration has been occurring at increasingly deeper levels of water. As the water levels increase and the wells drilled lengthen, the subsurface formations often become more complex. To facilitate more efficient petroleum recovery, it is often desirable to generate a vertical seismic profile.

A vertical seismic profile (VSP) is a class of borehole seismic measurements used for correlation between surface seismic receivers and wireline logging data. VSPs can be used to tie surface seismic data to well data, providing a useful tie to measured depths. Typically VSPs yield higher resolution data than surface seismic profiles provide. VSPs enable converting seismic data to zero-phase data as well as enable distinguishing primary reflections from multiples. In addition, a VSP is often used for analysis of portions of a formation ahead of the drill bit.

Narrowly defined, VSP refers to measurements made in a vertical wellbore using acoustic receivers inside the wellbore and a seismic source at the surface near the well. In a more general context as used herein, however, VSPs vary in well configuration, the number and location of sources and acoustic receivers, and how they are deployed. Nevertheless, VSP does connote the deployment of at least some receivers in the wellbore. Most VSPs use a surface seismic source, which is commonly a vibrator on land, or an air gun in marine environments.

There are various VSP configurations including zero-offset VSP, offset VSP, walkaway VSP, vertical incidence VSP, salt-proximity VSP, multi-offset VSP, and drill-noise or seismic-while-drilling VSP. Check-shot surveys are similar to VSP in that acoustic receivers are placed in the borehole and a surface source is used to generate an acoustic signal. However, a VSP is a more detailed than a check-shot survey. The VSP receivers are typically more closely spaced than those in a check-shot survey; check-shot surveys may include measurement intervals hundreds of meters apart. Further, a VSP uses the reflected energy contained in the recorded trace at each receiver position as well as the first direct path from source to receiver while the check-shot survey uses only the direct path travel time.

While VSPs can provide valuable information about a formation, source perturbations (e.g. shot to shot variations in the seismic signature of an air gun) introduce error into the raw seismic data which percolates through the processing chain to the final images produced. VSP source perturbations can limit the full range of usefulness that VSPs data can provide. In marine surface seismic acquisitions, these source perturbations can be well controlled through digital gun controllers and processes such as source signal estimation (see, for example, U.S. Pat. Nos. 4,757,482; 5,581,415; 5,995,905; and 4,476,553, which are hereby incorporated by reference).

However, in VSP acquisitions, particularly marine VSPs, there is currently no standard gun controller to limit error introduced by source perturbations. This lack of control is problematic, because the shot to shot variations in the source wavelet are often significant. These errors are caused by variations in the timing and firing pressure, which can be pronounced. In rough seas, elevation changes can also cause errors. Some have added an uncalibrated hydrophone near the source (usually located a few meters from the source) to provide partial information useful for correcting time break errors (errors attributable to time differences for high waves, irregular source firings, etc.). Nevertheless, the partial information from the added hydrophone is not sufficient for a full shot deconvolution because of the proximity of the source, and in practice, such hydrophones are arbitrarily placed in relation to the source and do not record with sufficient signal fidelity to be useful. As a result, only gross errors in VSP source data are currently corrected Therefore, sophisticated seismic data processing methods may not be used because current methods do not provide VSP seismic source information with the precision necessary to make sophisticated processing meaningful.

Further, some seismic systems include a cluster or array of air guns. Some of these systems fire all of the air guns simultaneously. The intent of the multiple air guns is to increase the amplitude of the seismic signal. However, the vertical spacing between the air guns and sea-surface results in an offset of the signals and what is sometimes referred to as "ghosting."

Offset surveys come in a variety of options, ranging from the simple fixed offset survey to the complex Spiral 3D-VSP. Offset operations usually include a seismic source having one to twelve or more air guns, a remote installation (such as a boat) that moves according to a fixed offset, a walkaway line, or a spiral. There may be one or more boats involved, each with at least one seismic source. However, the most basic remote seismic measurement operations typically involve a single boat, at fixed position, firing one, two, or three air guns configured in a cluster.

SUMMARY

The present disclosure addresses at least some of the above-described needs and others. One aspect provides a method for conducting a borehole seismic survey with one or more seismic receiver deployed in a borehole. The method uses a first seismic survey system and a second remote seismic survey system, and the method comprises providing a first satellite receiver at the first seismic survey system and a second satellite receiver at the second seismic survey system, receiving a universal time signal by each of the first and second satellite receivers, choosing a unique time break based on the universal time signal, communicating the unique time break to an acquisition control system of the first seismic survey system and a source control system of the second remote seismic survey system, and synchronizing source firing of the second remote seismic system with recording of seismic data from the one or more receiver at the time break based on the universal time signal. In one embodiment, the synchronized recording comprises downhole data acquisition and surface data acquisition, for example, with a near field receiver in the vicinity of the source. In one aspect, the unique time break is a pre-programmed time.

In one aspect of the method, the first and second satellite receivers comprise GPS receivers. In one aspect, the method further comprises monitoring position and course of the second remote seismic survey system, and communicating position and course of the second remote seismic survey system to the first seismic survey system via a digital wireless link. Moreover, choosing the unique time break may comprise predicting the time break for a target of the second remote seismic survey system based on the course of the second remote seismic survey system. One embodiment of the method further comprises sending commands for firing and recording seismic data at the time break at a predetermined time in advance of the time break to provide enough time for data transmission between the first and second seismic systems and for firing preparation.

In one aspect of the method, the first and second satellite receivers comprise GPS receivers, and the method further comprises monitoring position and course of the second remote seismic survey system, communicating position and course of the second remote seismic survey system to the first seismic survey system via a digital wireless link, where choosing the unique time break comprises predicting multiple time breaks for targets of the second remote seismic survey system based on the course of the second remote seismic survey system and a shooting plan.

According to one aspect where the first and second satellite receivers comprise GPS receivers, there is a third remote seismic survey system having a third GPS receiver. The method may then include monitoring position and course of the second and third remote seismic survey systems, communicating position and course of the second and third remote seismic survey systems to the first seismic survey system via a digital wireless link, and choosing the unique time break comprises predicting multiple time breaks for targets of the second and third remote seismic survey systems based on the courses of the second and third remote seismic survey systems and a shooting plan. In one aspect, a borehole seismic survey comprises one of: a walkaway and a 3D VSP. In one aspect, the universal time comprises one of: GPS time, Meridian time, Glonas time, and Galileo time.

One embodiment provides an apparatus comprising a first seismic survey system and a second remote seismic survey system. The first seismic survey system comprises at least one borehole receiver, a seismic recorder operatively connected to the at least one borehole receiver, a first (possibly master) computer controller controlling seismic acquisition recording time, and a first GPS receiver. The second remote seismic survey system is offset horizontally from the first seismic survey system, and the second remote seismic survey system comprises a seismic source, a second GPS receiver, a second (e.g. slave) computer controller controlling firing of the seismic source, and a high speed, wireless, digital link between the first and second seismic survey systems. The first and second controllers are programmed to synchronize firing of the seismic source with recording of seismic data from the seismic recorder at a time break based on a universal time available to both the first and second GPS receivers.

In one embodiment of the apparatus, the seismic recorder comprises a wireline tool. In one embodiment, the second remote seismic survey system comprises a boat. In some embodiments, the synchronized recording comprises downhole data acquisition and surface data acquisition, for example, with a near field receiver in the vicinity of the source. In some embodiments, the second remote seismic survey system comprises a navigation system, and the time break comprises multiple time breaks predicted by the navigation system for targets of the second remote seismic survey system based on the course of the second seismic survey system and a shooting plan. One embodiment further comprises programming that sends commands for synchronized source firing and recording seismic data at the time break at a predetermined time in advance of the time break.

One aspect provides a method of seismic surveying using a first seismic survey system and a second, remote seismic survey system. The second seismic survey system includes a first seismic source, and the method comprises providing at least one receiver deployed in a borehole and configured to receive seismic waves generated by the first seismic source of the second remote seismic survey system, displaying at the first seismic survey system a location and course of the second remote seismic survey system, receiving at the first and second survey systems a universal time, using a GPS system to predict a time break, based on the universal time, that the second remote seismic survey system will be located at a target, communicating the time break between the first and second seismic survey systems, synchronizing firing of the first seismic source at the target with recording of seismic waves received by the at least one receiver deployed in the borehole, and generating a VSP from the seismic waves received by at least one receiver deployed in the borehole. In some embodiments, the synchronized recording comprises downhole data acquisition and surface data acquisition, for example, with a near field receiver in the vicinity of the source.

One aspect provides a method of seismic surveying using a first seismic survey system and a second, remote seismic survey system, where the second seismic survey system includes a first seismic source. The method comprises providing at least one receiver deployed in a borehole and configured to receive seismic waves generated by the first seismic source of the second remote seismic survey system, receiving at the first and second survey systems a universal time, communicating a time break between the first and second seismic survey systems, the time break based on the universal time; and, at the time break, synchronizing firing of the first seismic source with recording of seismic waves received by the at least one receiver deployed in the borehole. One aspect of the method comprises synchronization of the source firing with downhole data acquisition and surface data acquisition. One aspect of the method further comprises displaying at the first seismic survey system a location and course of the second remote seismic survey system, using a GPS system to predict the time break, based on the universal time, that the second remote seismic survey system will be located at a target, where the synchronizing comprises synchronizing firing of the first seismic source at the target with downhole and surface recording of seismic waves. One aspect further comprises communicating the time break between the first and second seismic survey systems via a wireless digital link. One aspect further comprises generating a VSP.

One embodiment provides a seismic system. The seismic system comprises a first seismic source, a second seismic source spaced vertically from the first seismic source, a first seismic sensor at the second seismic source, and a controller operatively connected to the first and second seismic sources and the first seismic sensor. The controller is programmed to fire the first seismic source and adjust a firing time of the second seismic source based on feedback from the first seismic sensor. In one embodiment, the controller is programmed to adjust the firing time of the second seismic source based on feedback from the first seismic sensor to align a first pressure peak of the second seismic source with a first pressure peak of the first seismic source. One embodiment further comprises a third seismic source spaced vertically from the second seismic source and a second seismic sensor at the third seismic source. The controller is operatively connected to the third seismic source and the second seismic sensor, and the controller is programmed to adjust a firing time of the third seismic source based on feedback from the second seismic sensor to align a first pressure peak of the third seismic source with the first pressure peaks of the first and second seismic sources.

In one embodiment of the seismic system, each of the seismic sources comprises an air gun chamber of different volume to compensate for variations in source signature caused by increasing water pressure with depth. In some embodiments, the controller is an in-sea controller. In one embodiment, the first and second seismic sources comprise in-sea air guns.

One embodiment of the seismic system further comprises a plurality of receivers deployed in a borehole and a synchronization unit operatively connected to the plurality of receivers and the controller. The synchronization unit synchronizes staggered seismic source firing with recording of the plurality of receivers in the borehole.

One embodiment of the seismic system further comprises a plurality of additional vertically spaced seismic sources, and a seismic sensor at each of the plurality of additional vertically spaced seismic sources. The controller is operatively connected to each of the plurality additional seismic sources and each seismic sensor. The controller is programmed to adjust the firing time of each of the plurality of additional vertically spaced seismic sources based on feedback from the seismic sensors to align first pressure peaks of each of the plurality of additional vertically spaced seismic sources with a first pressure peak of the first seismic source. In some embodiments, each of the seismic sources comprises an air gun chamber of different volume to compensate for variations in source signature caused by increasing water pressure with depth.

One embodiment provides a survey system comprising a plurality of receivers deployed in a subsea borehole, a seismic source array aligned vertically in-sea at the surface, at least one seismic sensor at one or more individual sources of the seismic source array, and an in-sea source controller configured to sequentially fire the individual sources of the seismic source array and align first pressure peaks of the individual sources. In one embodiment, at least one seismic sensor comprises a seismic sensor at each individual source except for a first individual source, and the seismic sensors provide feedback to the in-sea source controller to facilitate the aligning of first pressure peaks. In one embodiment, the in-sea source controller receives feedback from progressively deeper sensors of at least one seismic sensor and adjusts firing of the individual sources in response to the feedback to align the first pressure peaks. In one embodiment, the system is at a fixed horizontal set of coordinates. Some embodiments of the in-sea source controller are programmed to fire the seismic source array at a constant absolute height. In some embodiments, the in-sea source controller is programmed to fire the seismic source array at a fixed vertical location with respect to the receivers deployed in the subsea borehole. One embodiment further comprises a synchronization unit operatively connected to the plurality of receivers and the controller, and the synchronization unit synchronizes the sequential source firing with recording of the plurality of receivers deployed in the subsea borehole. In some embodiments, the in-sea source controller is configured to dynamically change the sequential firing of the individual sources of the seismic source array to align first pressure peaks of the individual sources.

One aspect provides a method of controlling in-sea seismic source firing. The method comprises dynamically staggering the firing of an in-sea array of seismic sources, and increasing the amplitude of a pressure wave generated by the staggered firing. In one embodiment, dynamically staggering the firing comprises receiving feedback from one or more seismic sensors local to the in-sea array, and staggering a firing sequence of the- in-sea array of seismic sources based on the feedback. In one embodiment, dynamically staggering the firing comprises receiving seismic feedback from a plurality of seismic sensors (where there is at least one of the plurality of seismic sensors associated with all but a first individual source of the in-sea array), and staggering a firing sequence of the in-sea array of seismic sources based on the feedback. In some embodiments, dynamically staggering the firing comprises firing a first individual seismic source of the in-sea array, detecting a first pressure peak resulting from the firing of the first individual seismic source, sending first pressure peak data to a controller, and firing a second individual seismic source of the in-sea array based on first pressure peak data. In one embodiment, dynamically staggering the firing comprises firing a second seismic source of the in-sea array based on first pressure peak data, and the increasing amplitude of a pressure wave comprises aligning a first pressure peak of the second seismic source with the first pressure peak of the first seismic source. In one embodiment, dynamically staggering the firing comprises firing a third seismic source of the in-sea array based on the first pressure peak data resulting from the firing of the first and second seismic sources, and the increasing amplitude of a pressure wave comprises aligning first pressure peaks of the second and third seismic sources with the first pressure peak of the first seismic source.

According to one aspect of the method of controlling in-sea seismic source firing, the dynamically staggering firing comprises (a) firing a seismic source of the in-sea array, (b) detecting a first pressure peak resulting from the firing of the seismic source, (c) sending first pressure peak data to a controller, (d) firing a subsequent seismic source of the in-sea array based on first pressure peak data; and (e) repeating steps (a)-(d) for each seismic source of the in-sea array, and increasing amplitude of a pressure wave comprises aligning the first pressure peaks of each seismic source.

One aspect provides a method of seismic surveying. The method comprises firing a first air gun under water at a first depth closest to surface, monitoring a first pressure wave from the first seismic source with a first sensor, feeding back monitored first pressure wave data to a controller, firing a second air gun at a second depth, the second depth deeper than the first depth, based on monitored first pressure wave data to substantially maximize wave amplitude by superposition of pressure waves from the first and second air guns, and receiving wave data related to a subsurface formation resulting from the firing of the air guns. In one embodiment, the method further comprises firing additional air guns sequentially, each deeper than the last, based on monitored pressure wave data from previous firings, to further substantially maximize wave amplitude by superposition of pressure waves from all air guns.

One aspect provides a method comprising firing an air gun under water at a first location, measuring a downgoing pressure wave resulting from the firing of the air gun at a second, deeper location; subsequently firing additional air guns, and actively adjusting a firing time of each subsequently fired additional air gun to continually align pressure peaks of all of the air guns. In one embodiment, actively adjusting further comprises increasing an amplitude of the downgoing pressure wave. In one embodiment, the actively adjusting comprises feeding measurements of the downgoing pressure wave at sequentially deeper locations to an air gun controller.

One embodiment provides a source control system for borehole seismic surveys comprising a seismic source, at least one receiver deployed in a borehole and configured to receive seismic waves generated by the seismic source, a handling system configured to deploy the seismic source at a predetermined location relative to the borehole receiver; and an in-sea source controller configured to fire the seismic source when at a predetermined height relative to borehole receivers based on variations in height due to marine conditions. One embodiment further comprising a global positioning system (GPS). One embodiment further comprising a float attached above the seismic source and in-sea source controller, wherein the float comprises a motion sensor for detecting changes in height due to waves or variations in tide. The motion sensor may comprise a global positioning system. One embodiment comprises a switch controllable by the in-sea source controller to trigger firing of the seismic source at a predetermined wave height. One embodiment further comprises one or more in-sea sensors having a fixed geometry relative to the seismic source. In one embodiment, one or more in-sea sensors may comprise a depth sensor. One or more of the in-sea sensors may comprise a firing pressure sensor.

One embodiment provides a survey system comprising a plurality of receivers deployed in a borehole, a seismic source cluster at or near a sea surface at a predetermined location relative to the borehole receivers, a handling system, an umbilical, and an in-sea source controller configured to sequentially fire individual sources of the seismic source cluster and align first pressure peaks of the individual sources. One embodiment further comprises a float, and the float includes a motion sensor for detecting changes in height due to waves or variations in tide.

One aspect provides a method of using a source control system, comprising deploying at least one receiver in a borehole, deploying a seismic source at or near a sea surface at a predetermined location relative to the borehole receiver, controlling the firing of the seismic source with an in-sea source controller, and synchronizing the seismic source firing with the borehole receiver recording so that seismic waves generated by the seismic source are received by the borehole receiver. The method may further comprise automatically tuning the seismic source. Automatically tuning may comprise aligning first pressure peaks of individual seismic sources. The seismic waves received by the borehole receivers may be used to generate a VSP. In one embodiment, the method further comprises measuring a seismic source firing pressure directly at the seismic source and measuring a seismic source depth in water directly at the seismic source.

One aspect provides a method of improving a VSP survey. The method comprises deploying a seismic source at a predetermined location relative to a borehole, deploying at least one receiver in the borehole, and controlling firing of the seismic source to fire at a predetermined height above a sea floor based on variations in height due to marine conditions. One embodiment further comprises synchronizing seismic source firing, downhole seismic receiver recording, and surface seismic receiver recording with a time standard. One embodiment comprises combining statistical quality control analysis of surface source performance with borehole receiver performance.

One embodiment provides a source control system for borehole seismic surveys comprising at least one receiver deployed in a borehole, a seismic source, a handling system configured to deploy the seismic source at a predetermined location relative to the borehole receiver, an umbilical, an in-sea source controller configured to synchronize the firing of the seismic source with borehole receiver recording, and a bathymetry sensor configured to ensure a constant, absolute firing height of the seismic source to compensate for variations in marine conditions.

One embodiment provides a survey system comprising a plurality of receivers deployed in a borehole, a seismic source at or near a sea surface, a handling system, an umbilical, an in-sea source controller configured to control the firing of the seismic source, a synchronization unit operatively connected to the in-sea source controller and configured to synchronize recording of the plurality of receivers in the borehole and firing of the seismic source, and a GPS sensor in communication with the source controller such that the seismic souret is fired at a constant, absolute firing height of the seismic source to compensate for variations in marine conditions.

One embodiment provides a source control system for borehole seismic surveys comprising an underwater seismic source, at least one receiver deployed in a subsea borehole and configured to receive seismic waves generated by the underwater seismic source, a stationary handling system configured to deploy the underwater seismic source, a vertical height sensor for detecting water height operatively connected to the underwater seismic source, and a source controller programmed to fire the underwater seismic source at a predetermined water height based on information from the vertical height sensor.

One embodiment provides a source control system for borehole seismic surveys comprising an underwater seismic source, at least one receiver deployed in a subsea borehole and configured to receive seismic waves generated by the underwater seismic source, a handling system configured to deploy the seismic source, and a source controller configured to fire the underwater seismic source at a constant absolute height.

BRIEF DESCRIPTION OF THE DRAWINGS

The accompanying drawings illustrate certain embodiments and are a part of the specification.

FIG. 1A is a schematic illustration of the survey geometry for the method of seismic surveying known as VSP surveying.

Figure 1B:
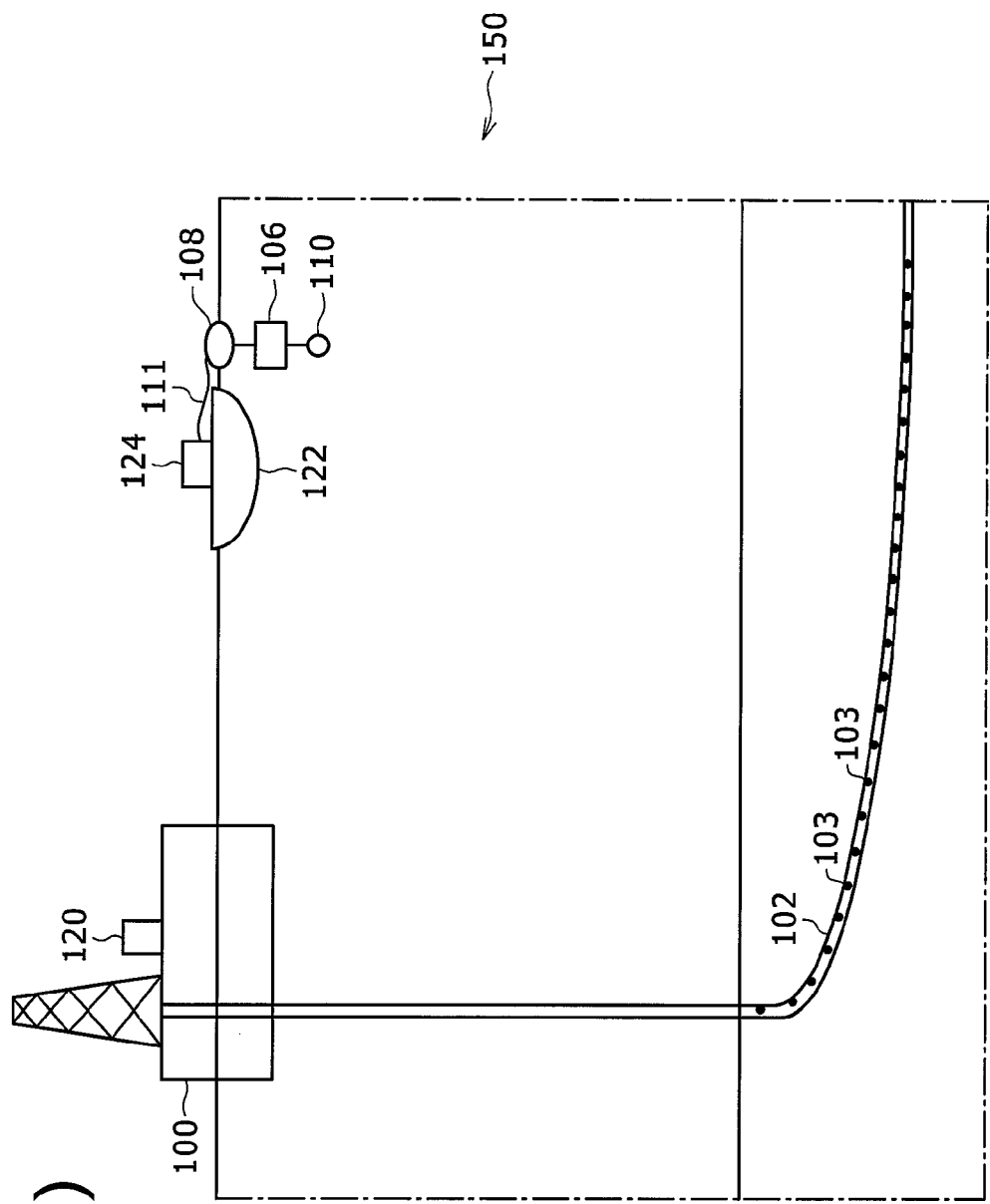
FIG. 1B shows an example of a borehole offset VSP measurement scenario in a marine environment in which an offshore rig 100 is positioned over a subsea borehole 102.

Throughout the drawings, identical reference numbers indicate similar, but not necessarily identical elements. While the principles described herein are susceptible to various modifications and alternative forms, specific embodiments have been shown by way of example in the drawings and will be described in detail herein. However, it should be understood that the invention is not intended to be limited to the particular forms disclosed. Rather, the invention includes all modifications, equivalents and alternatives falling within the scope of the appended claims.

DETAILED DESCRIPTION

Illustrative embodiments and aspects of the invention are described below. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be, complex and time-consuming, but would nevertheless be a routine undertaking for those of ordinary skill in the art having the benefit of this disclosure.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present invention. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Geophysical mapping techniques for determining subsurface structures in the Earth include, for example, seismic surveying, magnetotelluric surveying and controlled source electromagnetic surveying, among others. Generally, a variety of different seismic surveying techniques may be used in performing seismic exploration of different physical environments such as land environments and marine environments. Such seismic surveying techniques may include, for example, surface seismic exploration and borehole seismic exploration.

In surface seismic surveying, an array of seismic sensors is deployed at the Earth's surface (or near the water surface or on the water bottom for various types of marine seismic surveying), and one or more seismic energy sources is actuated at or near the Earth's surface in a location near the seismic sensor array. A record is made, indexed with respect to time of actuation of the seismic energy source, of signals corresponding to seismic energy detected by each of the sensors in the array. Seismic energy travels downwardly from the source and is reflected from acoustic impedance boundaries below the Earth's surface. The reflected energy is detected by the sensors. Various techniques are known in the art for determining the structure of the subsurface Earth formations below and/or adjacent to the sensor array from recordings of the signals corresponding to the reflected seismic energy. Other techniques known in the art provide estimates of fluid content in porous Earth formations from characteristics of the reflected energy such as its phase and/or amplitude.

Borehole seismic surveys are typically conducted by placing receivers in a borehole and operating a seismic source at the surface to generate an acoustic wave. Typically the receivers are placed in a shuttle and deployed downhole for the duration of the survey and then removed.

Seismic data are typically collected using an array of seismic sources and seismic receivers. The data may be collected on land using, for example, vibration devices or explosive charges as sources and geophones as receivers; or the data may be collected at sea using, for example, air guns as the sources and hydrophones as the receivers.

FIG. 1A is a schematic illustration of the survey geometry for the method of seismic surveying known as vertical seismic profiling (VSP) surveying. In this surveying geometry, the receiver 1 is not disposed on the earth's surface, but is disposed within the earth, in this example within a borehole 6. The seismic source 2 is disposed on the earth's surface. Two ray paths for seismic energy are shown in FIG. 1. Path 3 is a path in which the seismic energy does not undergo reflection, although it is refracted at the boundary between two layers 7, 8 of the earth. Since seismic energy that travels along this path travels direct from the source 2 to the receiver 1 without reflection, this path is known as the "direct path". Path 4 is a path in which seismic energy emitted by the source 2 is incident on the receiver 1 after reflection by a reflector 5 located at a greater depth than the receiver, and is thus known as a "reflection path".

In FIG. 1A the seismic source 2 is located at a distance from the point at which the vertical line on which the receiver 1 is disposed passes through the earth's surface. This geometry is known as offset VSP, since there is a non-zero horizontal distance between the seismic source and the receiver. The horizontal distance between the seismic source and the receiver is generally known as "offset". In an alternative VSP geometry, the seismic source is located nearly vertically over the receiver, and this is known as zero-offset VSP.

FIG. 1A shows only one seismic source and one receiver, but it is possible for there to be more than one source and/or more than one receiver. In the survey geometry known as multi-offset VSP, a plurality of seismic sources are located on the surface of the earth, with each source having a different offset (i.e., being at a different horizontal distance from the point at which the vertical line on which the receiver 1 is disposed passes through the earth's surface).

A vertical seismic profile (VSP) is a class of borehole seismic measurements used for correlation between surface seismic receivers and wireline logging data. VSPs can be used to tie surface seismic data to well data, providing a useful tie to measured depths. Typically VSPs yield higher resolution data than surface seismic profiles provide. VSPs enable converting seismic data to zero-phase data as well as enable distinguishing primary reflections from multiples. In addition, a VSP is often used for analysis of portions of a formation ahead of the drill bit.

Conventionally, there are a variety of different VSP configurations including zero-offset VSP (Z-VSP), offset VSP, walkaway VSP, vertical incidence VSP (VI-VSP), salt-proximity VSP, multi-offset VSP, 3D-VSP, and drill-noise or seismic-while-drilling VSP. Check-shot surveys are similar to VSP in that acoustic receivers are placed in the borehole and a surface source is used to generate an acoustic signal. However, a VSP is a more detailed than a check-shot survey. The VSP receivers are typically more closely spaced than those in a check-shot survey; check-shot surveys may include measurement intervals hundreds of meters apart. Further, a VSP uses the reflected energy contained in the recorded trace at each receiver position as well as the first direct path from source to receiver while the check-shot survey uses only the direct path travel time.

While VSPs can provide valuable information about a formation, source perturbations (e.g. shot to shot variations in the seismic signature of an air gun) introduce error into the raw seismic data which percolates through the processing chain to the final images produced. VSP source perturbations can limit the full range of usefulness that VSPs data can provide. In marine surface seismic acquisitions, these source perturbations can be well controlled through digital gun controllers and processes such as source signal estimation (see, for example, U.S. Pat. Nos. 4,757,482; 5,581,415; 5,995,905; and 4,476,553, which are hereby incorporated by reference in their entirety for all purposes).

FIG. 1B shows an example of a borehole offset VSP measurement scenario in a marine environment in which an offshore rig 100 is positioned over a subsea borehole 102. The borehole 102 includes a plurality of spaced receivers 103 to facilitate, for example, a vertical seismic profile VSP acquisition. When performing borehole offset VSP measurements in a marine environment, a boat 122 is typically used to transport the seismic signal source equipment to a desired location away from the offshore rig 100.

In the example of FIG. 1B, the seismic signal source equipment which is located at the boat includes an air-gun or guns 106 suspended below the surface by a float 108. An analog hydrophone 110 is suspended below the air-gun 106. The hydrophone 110 can provide partial information for correcting time break errors attributable to time differences for swells, irregular source firings, etc. One or more analog lines form part of an umbilical 111 that may also include an air line. The umbilical 111 provides an analog communications/control link between the boat-side seismic survey computer system 124 and the signal source equipment.

Typically, the rig-side seismic survey computer system 120 and the boat-side seismic survey computer system 124 are initially configured with desired operating parameters before deployment in the field. Once the computer systems have been deployed in the field, a human technician is stationed at each system to operate their respective equipment in order to carry out seismic survey measurements. Communication between the rig-side seismic survey computer system and the boat-side seismic survey computer system is typically implemented using an analog radio communication link.

Conventionally, rig-side seismic survey computer systems and boat-side seismic survey computer systems do not include functionality for enabling remote configuration or modification of their operating parameters. Thus, for example, when the rig-side technician (stationed at the rig-side seismic survey computer system) desires to modify an operating parameter at the boat-side seismic survey computer system, the rig-side technician is required to communicate (typically via radio communication) with the boat-side technician in order to instruct the boat-side technician to modify the desired parameter(s) at the boat-side seismic survey computer system. The boat-side technician is then responsible for implementing the specified parameter modifications at the boat-side seismic survey computer system.

Moreover, due to the complexity of seismic source control operations, conventional source control systems provide only limited quality control (QC) features, and provide only limited functionality for controlling source control equipment, especially for remote source signal and large source arrays.

According to at least one embodiment of the present invention, a new digital seismic source controller graphical user interface (GUI) may be implemented at the rig-side seismic survey computer system, remote-side (e.g., boat-side) seismic survey computer system, and/or other seismic survey computer systems. In at least one implementation, the seismic source controller GUI may include a plurality of different windows, each of which provides functionality for improved source control functionality. Such windows may include, for example: (1) a Main Window which provides for radio modem communication parameter control, Ethernet communication parameter control, master/slave connection control, database control, access to other sub windows, etc.; (2) a Fire Control Window which provides functionality for fire control configuration, source enable/disable control, system health check & sensor calibration, system mode selection, sensor reading monitor, sub system booting, etc.; (3) a Quality Control Window which provides function only for presenting QC plots such as, for example, source signature plots, source signature frequency plots, source tuning plots, source solenoid current plots, overlaid plots, tuning error history plots, source delay history plots, source depth plots, source pressure plots, etc.; (4) an Error Report Window which provides function only for displaying error messages relating to one or more of the seismic survey computer systems; (5) a System Configuration Window which provides functionality for local and/or remote configuration and/or modification of fire control parameters, source control setup and operating parameters, and configuration element setup and operating parameters, etc.

One of the unique features of the present invention is its ability to allow each source control system to be independently configured as a master or slave. In at least one implementation, a master system may be provided with the capability of partial remote control of the slave system and slave system operating parameters, including, for example, parameter modification, test firing, slave system assignment and selection, etc. In at least one embodiment, a master system may be configured or designed to control a plurality of slave systems.

Figure 2:
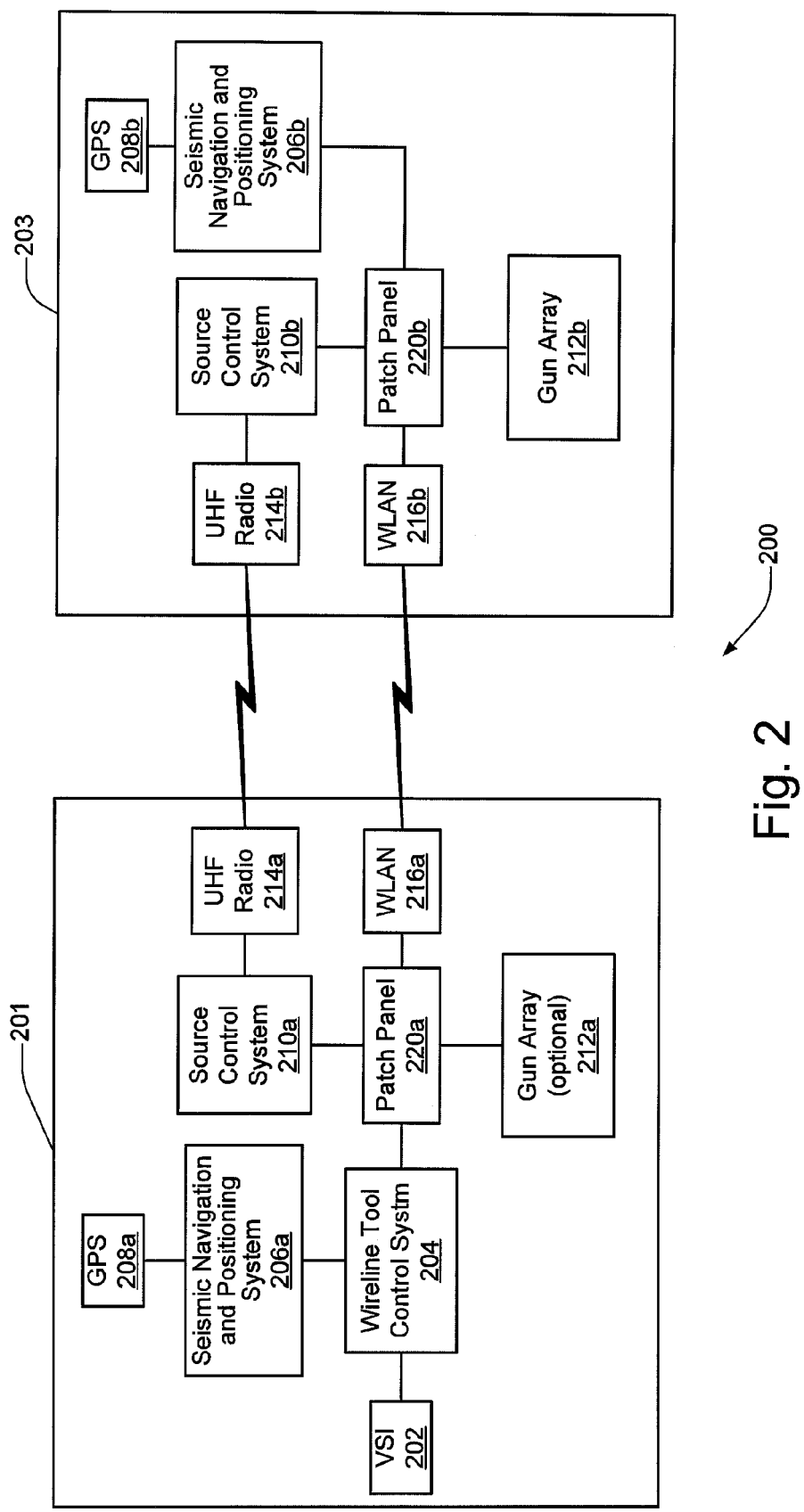
FIG. 2 shows a simplified block diagram of various components, systems, and/or devices which may be used for performing offset seismic surveying operations in accordance with the specific embodiment of the present invention.

FIG. 2 shows a simplified block diagram of various components, systems, and/or devices which may be used for performing offset seismic surveying operations in accordance with the specific embodiment of the present invention. According to a specific embodiment, block portion 201 may represent seismic survey equipment deployed at the offshore rig 100 (FIG. 1B), and block 203 may represent seismic survey equipment deployed at the boat 122. As illustrated in the example of FIG. 2, block portion 201 may include one or more of the following components: a GPS system 208a, a seismic navigation and positioning system 206a (also referred to as SWINGS), a source control system 210a (e.g., Trisor digital source control system, manufactured by WesternGeco-Fjord Instruments Inc.), a UHF radio 214a, a wire line tool control system 204 (e.g., MAXIS control system available from Schlumberger Technology Corporation), a patch panel system 220a, a wireless LAN transceiver 216a, etc. In specific implementations, block portion 201 may optionally include gun array 212a; and may include at least one versatile seismic imager (VSI) 202, and/or other seismic surveying equipment.

As illustrated in FIG. 2, block portion 203 may include one or more of the following components: a GPS system 208b, a seismic navigation and positioning system 206b, a source control system 210b, a UHF radio 214b, a patch panel system 220b, a wireless LAN transceiver 216b, at least one gun array 212b, etc.

It will be appreciated that alternate embodiments of the present invention (not shown) may include additional components not illustrated in FIG. 2, and/or may omit one or more components which are illustrated in the specific embodiment of FIG. 2.

Figure 3:
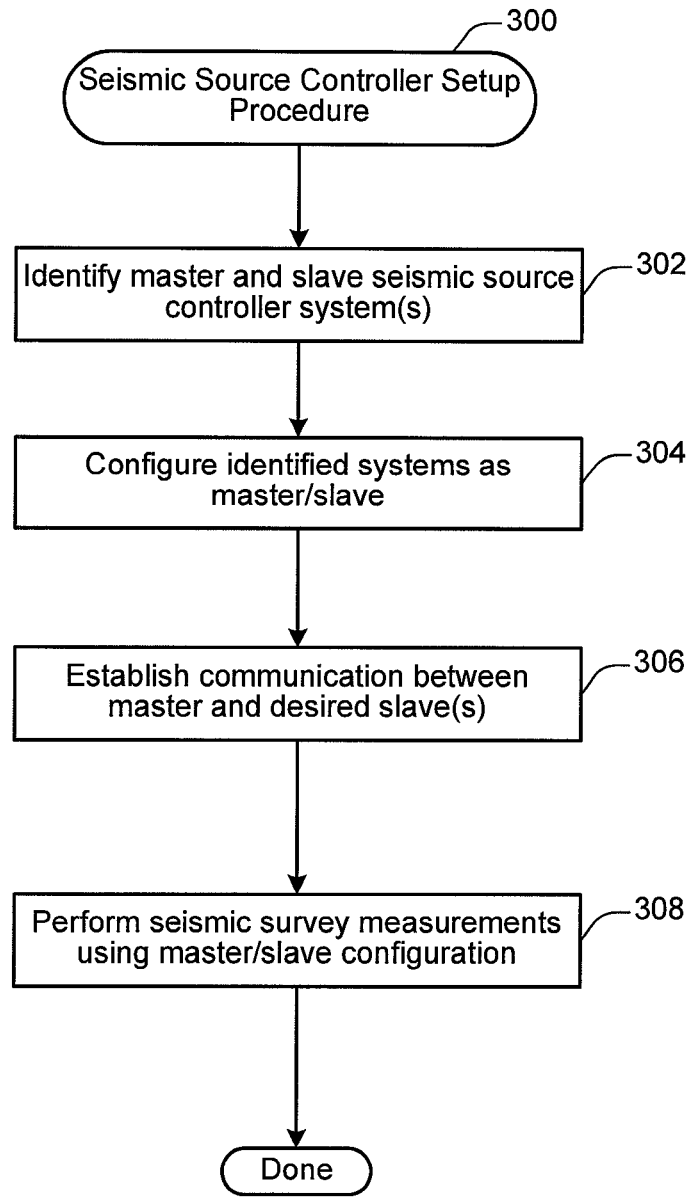
FIG. 3 shows a flow diagram of a Seismic Source Controller Setup Procedure 300 in accordance with the specific embodiment of the present invention.
Figure 5:
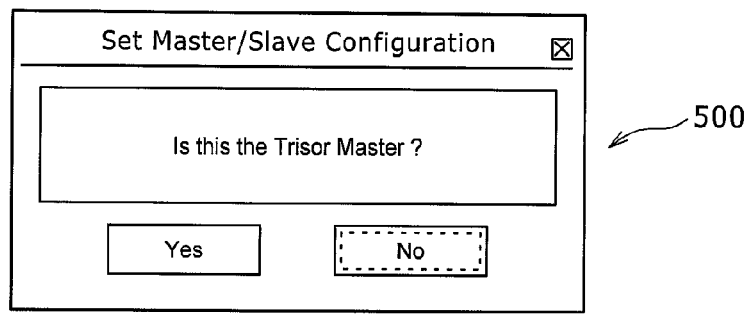
FIG. 5 illustrates a specific embodiment of a Set Master/Slave Configuration dialogue box 500.

FIG. 3 shows a flow diagram of a Seismic Source Controller Setup Procedure 300 in accordance with the specific embodiment of the present invention. According to at least one embodiment, the Seismic Source Controller Setup Procedure 300 may be implemented at the rig-side seismic survey computer system and/or remote-side seismic survey computer system. Initially, as illustrated at 302, the master and slave seismic source controller systems are identified, for example, by a human technician. In at least one embodiment, each source control system 210a, 210b may be initialized as a master or a slave. This is shown for example, in FIG. 5 of the drawings, which illustrates a specific embodiment of a Set Master/Slave Configuration dialogue box 500. According to a specific embodiment, dialogue box 500 may be displayed at each source control system upon startup in order to set master/slave configurations. In one implementation, a system may automatically default to being configured as a slave unless it has been designated as a master.

In a specific implementation, the rig-side source control system 210a may be configured at startup as a master, and the remote-side system 210b may be configured at startup as a slave (304, FIG. 3). Once the appropriate source control systems have been configured as master or slave, communication may then be established 306 between the master and selected slave(s). This is shown, for example, in FIG. 7 of the drawings, which illustrates a specific embodiment of a Slave Connection dialogue box 700. According to a specific implementation, both the master system and the slave system may be configured to be able to initiate communication between each other.

Figure 7:
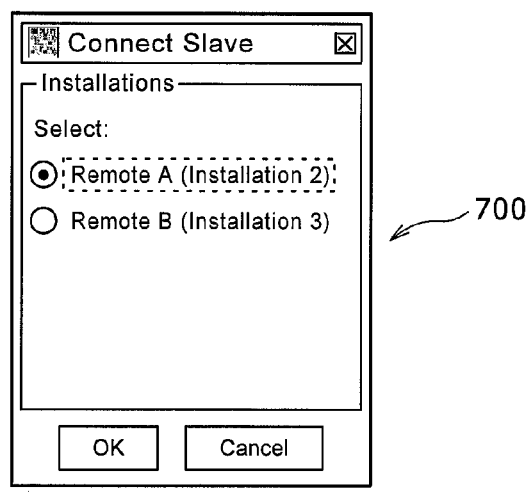
FIG. 7 illustrates a specific embodiment of a Slave Connection dialogue box 700.

As illustrated in the Slave Connection dialogue box of FIG. 7, the master system GUI provides the capability of allowing the master system to connect to one or more desired slave systems (e.g., Remote A slave, Remote B slave, etc.). Once communication between the master and desired slave systems has been established, seismic survey measurements may then be performed (308, FIG. 3) using the master/slave configured systems.

According to a specific embodiment, once the master and a slave are connected, the slave will be fully visible on the master. The master is then able to perform a variety of tasks relating to slave operation and control such as, for example:

a) Displaying and/or changing the current slave system operating mode.

b) Plotting and displaying data that is received at the slave system. According to a specific embodiment, the master system may be configured to display QC plots and/or sensor signal readings which may normally be displayed at the slave system. Additionally, the master system may be configured to record the data into a database which is stored at the master system.

c) Generating slave Tape Header information for wireline tool control system. According to a specific embodiment, the master system may be configured to generate and process, in real-time, QC data received from the slave system, and then send the processed QC data (typically referred to as "Tape Header") to the wireline tool control system in real-time.

d) Controlling firing the guns.

e) Changing Gun parameters. According to a specific embodiment, the master system may be configured to remotely change tuning and/or gun parameters at the slave system such as, for example, blanking intervals, manual delay, gun pulse width, pick polarity, filter method, etc.

According to a specific embodiment, the master source control system may be connected directly to the wireline tool control system 204 using, for example, a LAN connection (e.g., an Ethernet connection). Additionally, the slave source control system may be connected to the seismic navigation and positioning system 206b using, for example, a wired LAN connection.

According to a specific embodiment, data may be collected by components of the remote-side system and saved in a database located at the remote-side system or, alternatively, at the rig-side system. Additionally, in at least one implementation, data may also be collected by components of the rig-side system and stored in a local database such as, for example, a database located at the source control system 210a.

Figure 6:
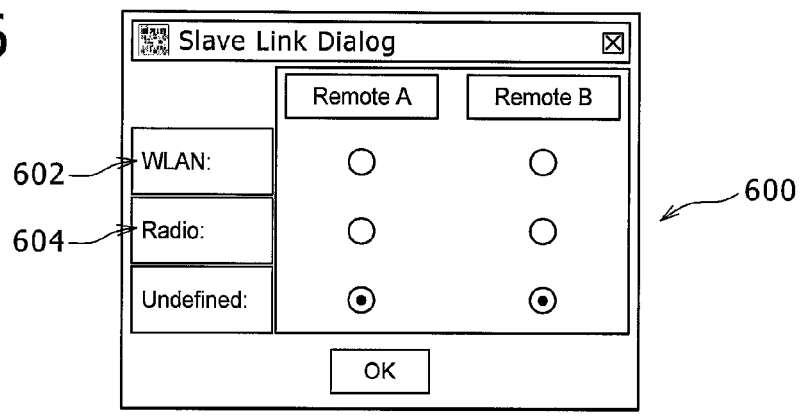
FIG. 6 illustrates a specific embodiment of a Slave Link Communication dialogue box 600.

In at least one implementation where the rig-side source control system 210a is configured as the master and the remote-side source control system 210b is configured as the slave, the source control system slave 210b may be configured or designed to collect and save data in a manner similar to that of the source control system master. Additionally, in at least one embodiment, the slave system(s) may be configured to communicate with the master system via radio modems (e.g., 214a, 214b) and/or wireless LAN transceivers (e.g., 216a, 216b). This is shown, for example, in FIG. 6 of the drawings, which illustrates a specific embodiment of a Slave Link Communication dialogue box 600. In the example of FIG. 6, the master system GUI is configured to provide a user with the ability to select the mode of communication between the master system and each of the slave systems. Thus, for example, using the dialogue box 600, a user may configure the master system to communicate with Remote A slave system via wireless LAN 602, and may configure the master system to communicate with Remote B slave system via radio 604.

Communication via radio modems provides relatively low bandwidth such as, for example, up to 100 kbps. In contrast, communication via wireless LAN transceivers provides relatively high bandwidth such as, for example, up to 54 Mbps. Moreover, unlike conventional techniques which provide for an analog communication link between the rig-side seismic survey system and boat-side seismic survey system, the technique of the present invention provides for a digital communication between the rig-side seismic survey system and boat-side (or remote-side) seismic survey system(s). In this way, digital seismic survey data and digital source control information may be digitally transmitted between the rig-side seismic survey system and desired remote-side seismic survey system(s). As a result, the seismic source control system and GUI of the present invention are able to provide a number of benefits and advantages over conventional seismic source control systems.

For example, the technique of one embodiment of the present invention provides for improved source signal firing timing accuracy. Using conventional techniques, source signal firing timing accuracy generally has an associated tolerance within the order of milliseconds. This is primarily due to the fact that conventional source signal timing synchronization is implemented between the master and remote signal source(s) using analog radio communication techniques which include an inherent radio delay factor. In contrast, one technique of the present invention may be used to improve the tolerance of timing accuracy and synchronization of the firing of the signal source(s) to within the order of microseconds. According to at least one implementation, the improved source signal timing accuracy of the present invention may be attributable to a combination of factors such as, for example, the use of GPS timing synchronization at the rig-side seismic survey computer system and remote-side seismic survey computer system(s), the use of a digital communication link (which can be optical) between the rig-side seismic survey computer system and remote-side seismic survey computer system(s), etc.

Another advantage of some embodiments of the present invention is improved quality control information and analysis during seismic survey measurement operations. According to at least one implementation, a Quality Control Window may be used to plot, in real-time, desired data, including real-time data collected during the seismic survey measurement operations. In a specific implementation, the Quality Control Window may include a plurality of different tabs relating to different types of sensors, such as, for example, Near Field Hydrophone (NFH), NFH Frequency, Gun, Current, Overlay, Tuning Error, Gun Delay, Depth, Manifold Pressure, etc. According to a specific embodiment, the Gun tab window may display signals from gun TB (Time Break) sensors for individual guns. The Current tab window may display information relating to gun solenoid currents for individual guns. The Overlay tab window may display, for example, NFH, Gun, and/or Current plots in the same window and time scale in order to facilitate comparison of the timing relationship of these signals. Data which is collected at the rig-side seismic survey computer system and/or data which is transmitted from the remote-side seismic survey computer system may be processed for QC analysis, and plotted. It is also possible to plot information relating to source signal fire control characteristics.

Figure 9:
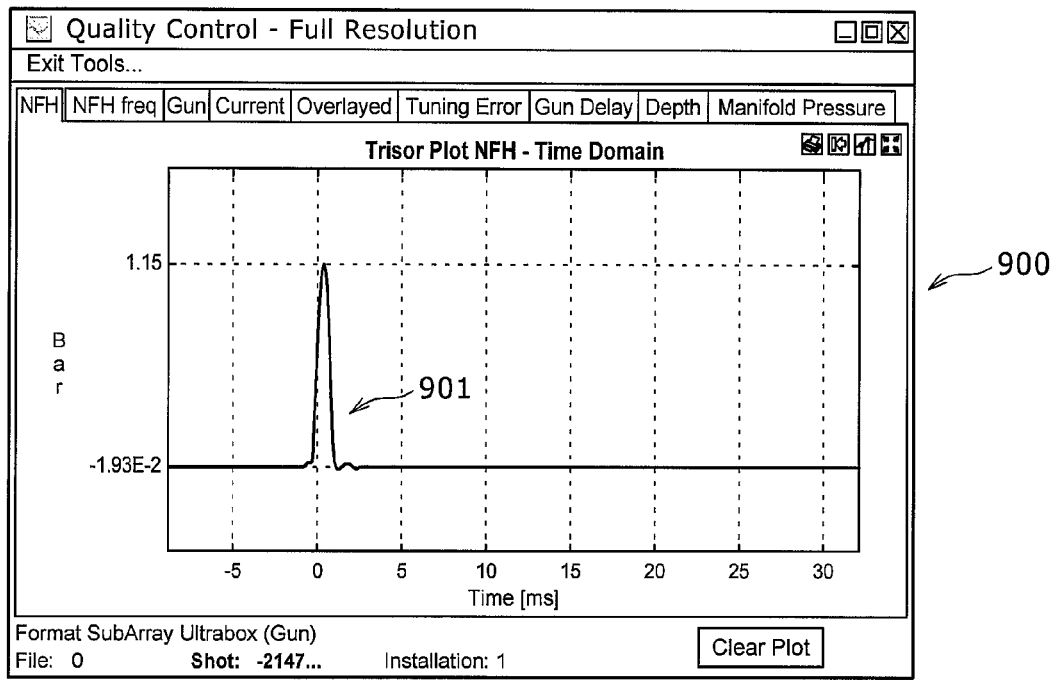
FIGS. 9-12 illustrate examples of various types of quality control information which may be displayed using a specific embodiment of the Quality Control Window of the present invention.
Figure 10:
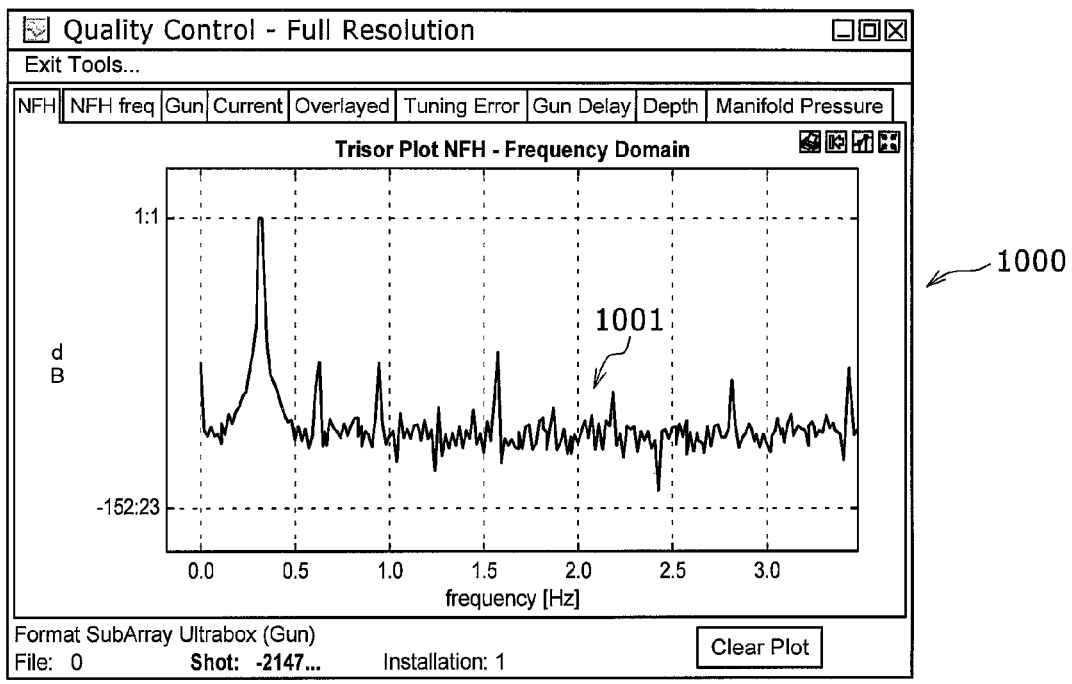
Figure 11:
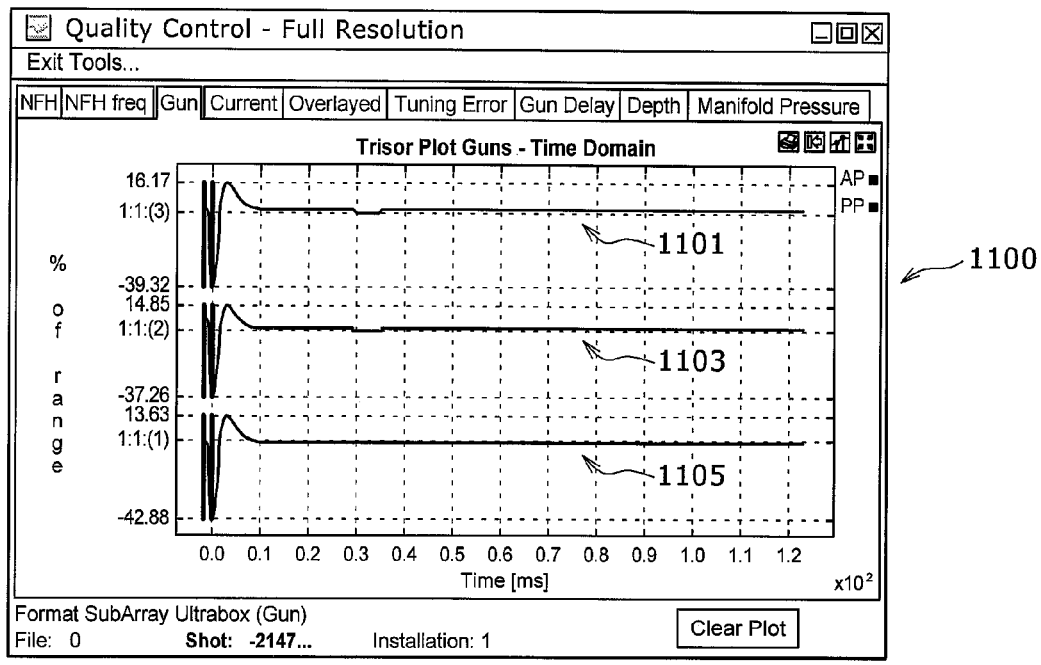
Figure 12:
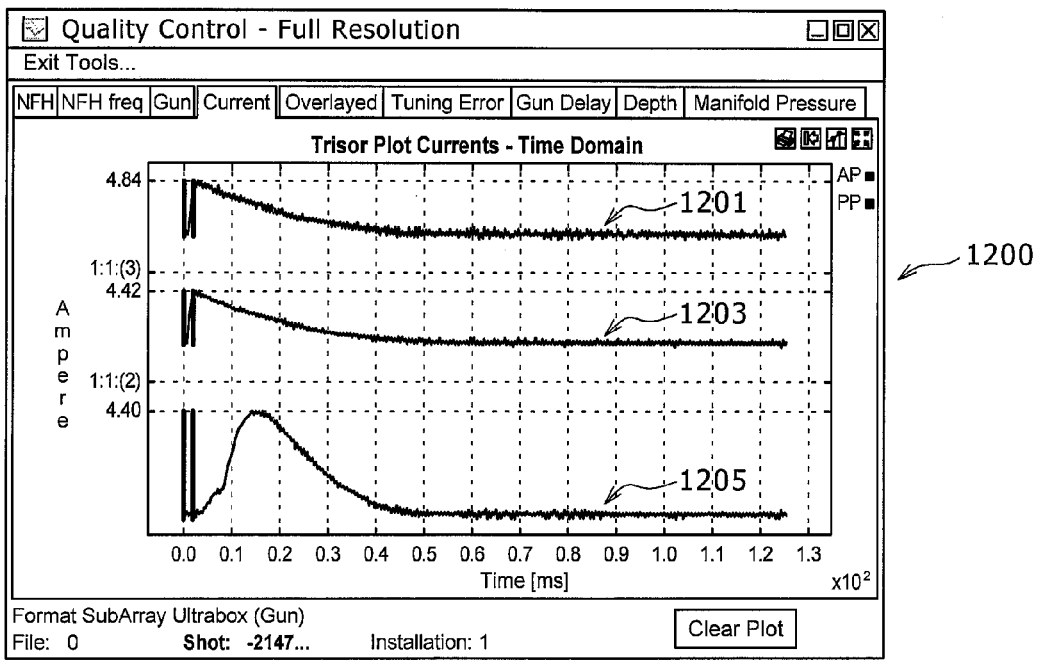

FIGS. 9-12 illustrate examples of various types of quality control information which may be displayed using a specific embodiment of the Quality Control Window of the present invention. For example, FIG. 9 shows a graphical illustration of real-time data relating to the source signal signature, which is displayed, for example, as a function of pressure v. time. FIG. 10 shows a graphical illustration of other real-time data relating to the source signal signature, which is displayed as a function of signal strength v. frequency. FIG. 11 shows a graphical illustration of real-time data relating to source timing signal device characteristics (e.g., air gun time break sensor signals, etc.) for selected guns, which is displayed, for example, as a function of normalized electrical voltage (%) v. time. FIG. 12 shows a graphical illustration of real-time data relating to other source signal device characteristics (e.g., air gun solenoid current characteristics, etc.) for selected guns, which is displayed as a function of electrical current v. time.

It will be appreciated that the present invention allows for various types of information to be analyzed and displayed for quality control analysis, including real-time data collected during the seismic survey measurement operations. Moreover, unlike conventional techniques, the technique of the present invention is able to provide improved quality control analysis functionality by providing high resolution displays of real-time QC data. Such high resolution displays of real-time QC data have traditionally been unavailable to conventional offset seismic survey systems. One reason for this is due to the fact that conventional offset seismic survey systems utilized a low bandwidth analog radio communication link to communicate between the rig-side seismic survey system and boat-side seismic survey system. However, as described previously, specific embodiments of the seismic survey systems of the present invention are able to be configured or designed to utilize a high bandwidth digital communication link to communicate between the rig-side seismic survey system and the remote-side seismic survey system. The use of a high bandwidth digital communication link between the rig-side seismic survey system and the remote-side seismic survey system allows for improved quality control analysis functionality, for example, by enabling high bandwidth communication of seismic survey measurement information, signal source information, and/or other QC information between the rig-side seismic survey system and the remote-side seismic survey system, which, in turn, allows for high resolution real-time QC information (such as that shown, for example, in FIGS. 9-12 of the drawings) to be displayed to the user.

In addition, the use of a high bandwidth digital communication link between the seismic survey computer systems of the present invention allows for shorter cycle time between seismic survey measurements. For example, the average cycle time for conventional offset seismic survey systems is about 10-15 seconds. In contrast, the average cycle time for offset seismic survey systems of the present invention is up to about 5 seconds.

Another advantageous feature which the seismic survey system of the present invention provides over conventional seismic survey systems is the ability to remotely monitor, control and modify desired parameters at the remote-side seismic survey system, particularly in response to QC analysis of previous seismic survey measurements.

Figure 4:
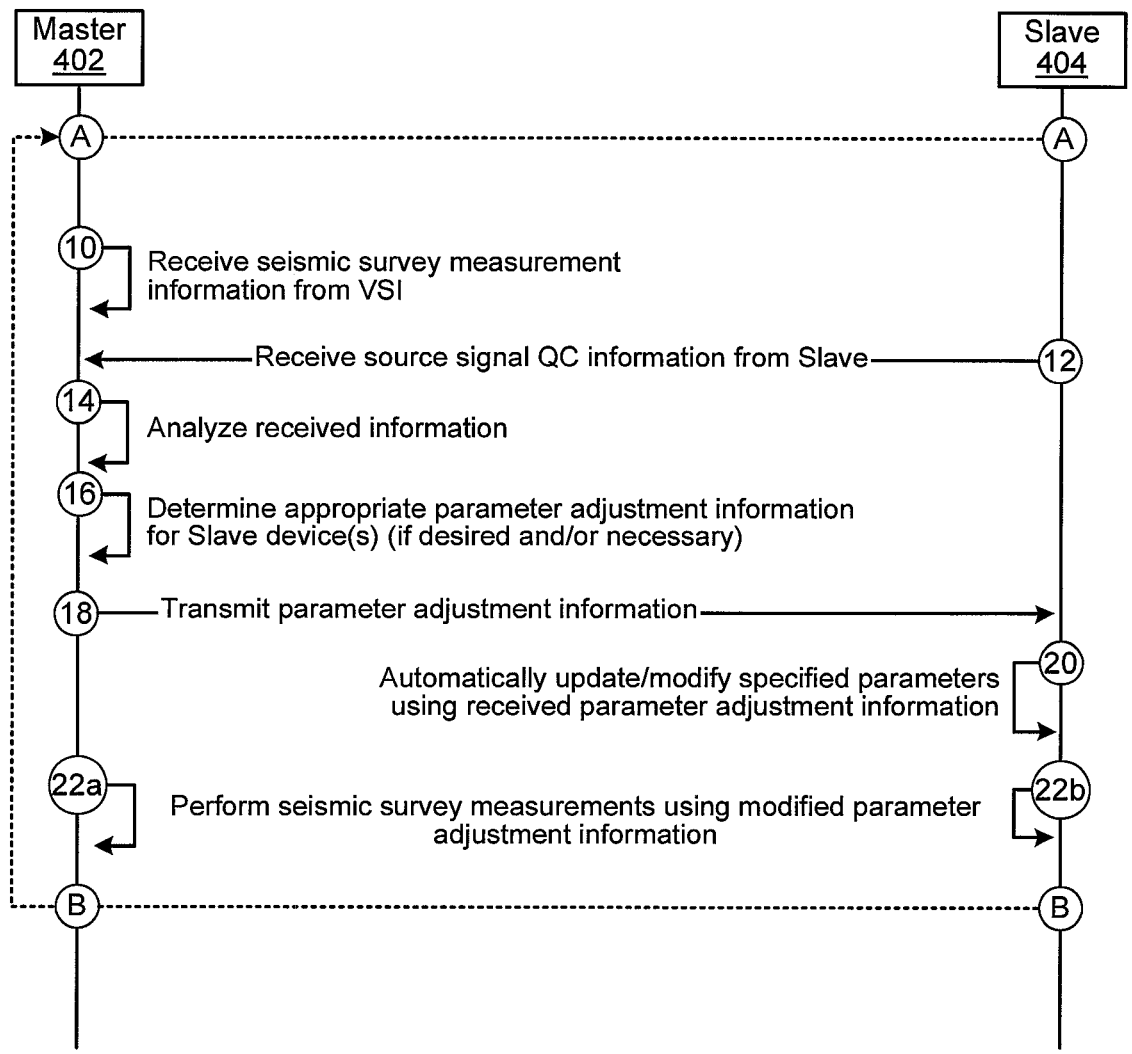
FIG. 4 shows an example of a flow diagram 400 illustrating a specific embodiment of how various information may be used to determine and dynamically modify desired parameters at a remote-side seismic survey system.

FIG. 4 shows an example of a flow diagram 400 illustrating a specific embodiment of how various information may be used to determine and dynamically modify desired parameters at a remote-side seismic survey system. Initially, in this example, it is assumed that at least one seismic survey measurement has been performed using the seismic survey equipment illustrated in FIG. 1B. As shown in FIG. 4, seismic survey measurement information (such as that recorded by receivers 103) is received (10) at the Wireline Tool Control System (204, FIG. 2) which is connected to the master seismic survey computer system 402. Additionally, source signal quality control information is transmitted (12) from the slave seismic survey system 404 to the master 402. At least a portion of the received information is then analyzed (14) using one or more of the above-described quality control analysis techniques and/or other quality control analysis techniques commonly known to one having ordinary skill in the art. In at least one embodiment, the QC analysis of the received information may be used to determine (16) desired parameter adjustment information relating to one or more of the devices associated with the slave seismic survey system. According to one embodiment, a human technician may utilize the analyzed QC information in order to generate desired parameter adjustment values for the slave system. In an alternate embodiment, at least a portion of the parameter adjustment values may be automatically generated and/or recommended by hardware and/or software components associated with the master system. Examples of different parameters of the slave system which may be remotely modified via the master system are illustrated in FIGS. 13-19 of the drawings.

Once the appropriate slave system parameter adjustment information has been determined, the parameter adjustment information is transmitted (18) to the slave system. Using the received parameter adjustment information, the slave system 404 may then automatically update and/or modify (20) appropriate parameter values at the slave system. According to a specific embodiment, the updating or modification of the parameter values at the slave seismic survey system may be performed in real-time and without the need for a human operator or technician to implement the parameter value modifications at the slave system. Additional seismic survey measurements may then be performed using the modified slave system parameter values. At least a portion of the measured data obtained during the additional seismic survey operations may then be transmitted to the master system 402 in order, for example, to perform additional QC analysis and/or parameter adjustments.

According to at least one implementation, the GUI of the present invention may include a Fire Control Window for facilitating remote parameter adjustment of the slave system. In one implementation, the Fire Control Window may be configured or designed to allow a user to perform various functions including, for example, loading desired configuration files and displaying visual models of the configuration parameters; remotely selecting the operating mode of the slave system (such as, for example, Control System Mode, Safe Mode, Test Mode, Offline Mode, Online Mode, etc.); remotely preparing, testing and/or controlling the slave system; displaying real-time data from the slave system sensors; etc. According to a specific embodiment, the configuration files may be implemented as files which model the remote-side hardware configurations) which, for example, may include information relating to settings, parameters and/or other information required for operating the source control system(s).

Figure 20:
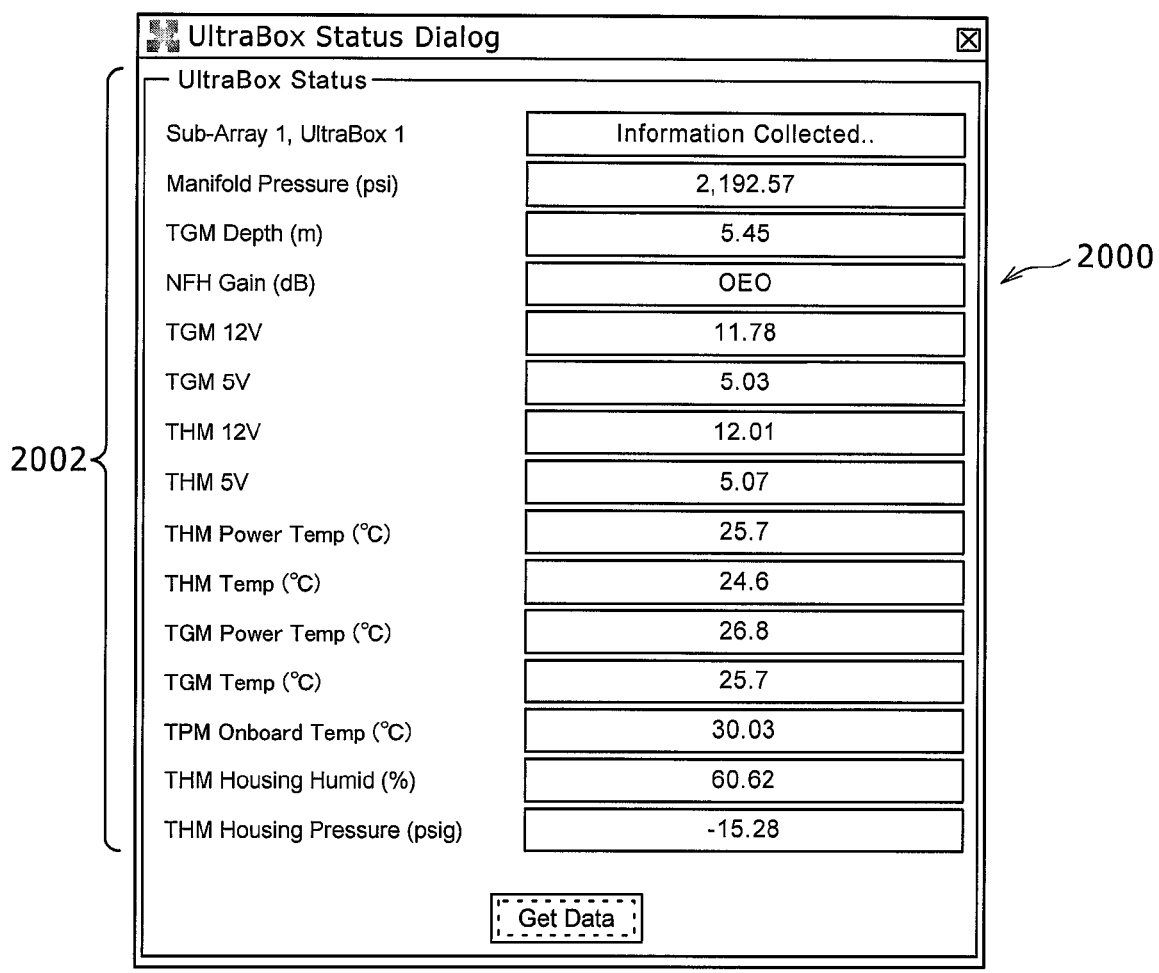
FIG. 20 shows a specific embodiment of a GUI 2000 which may be used for displaying various status information associated with the slave seismic survey system.

In a specific implementation, the Fire Control Window may be configured or designed to provide a variety of different pull-down menus which may be used to provide additional functionality. For example, a View menu may be used to select desired status information to be displayed to the user, for example, via the Fire Control Window GUI. Such information may include, for example, signal source device information (e.g., gun information), sensor information (e.g., NFH sensors, depth sensors, manifold sensors, etc.), communication information (e.g., fire pulse channel information), etc. An example of different types of status information which may be displayed his illustrated in FIG. 20 of the drawings. FIG. 20 shows a specific embodiment of a GUI 2000 which may be used for displaying various status information associated with the slave seismic survey system. In at least one embodiment, the information displayed in FIG. 20 represents real-time information which may be obtained from the slave system and displayed in real-time on the master system.

FIGS. 13-19 illustrate specific embodiments of various GUIs of the present invention which may be used to enable a user of a master seismic survey system to remotely modify parameters associated with one or more slave seismic survey systems. Each of these figures will now be discussed in brief detail in order to describe at least some of the various parameters of the slave system which may be remotely modified using one technique.

Figure 13:
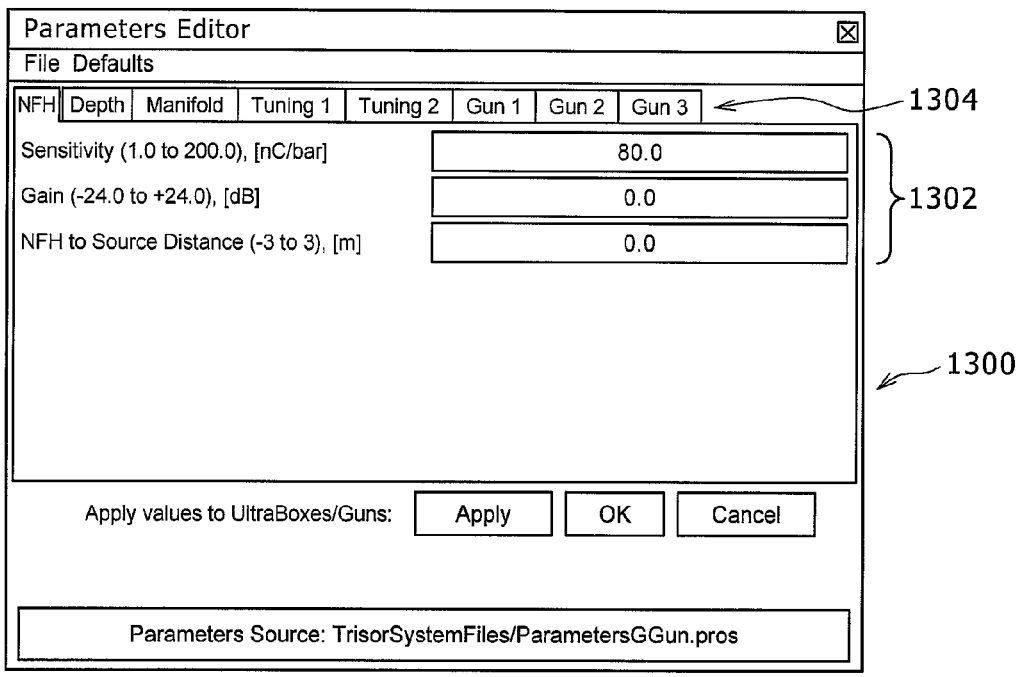
FIGS. 13-19 illustrate specific embodiments of various GUIs of the present invention which may be used to enable a user of a master seismic survey system to remotely modify parameters associated with one or more slave seismic survey systems.

FIG. 13 shows a specific embodiment of a GUI 1300 which may be used for remotely modifying NFH parameters such as, for example, sensitivity, gain, distance from NFH to signal source, etc.

Figure 14:
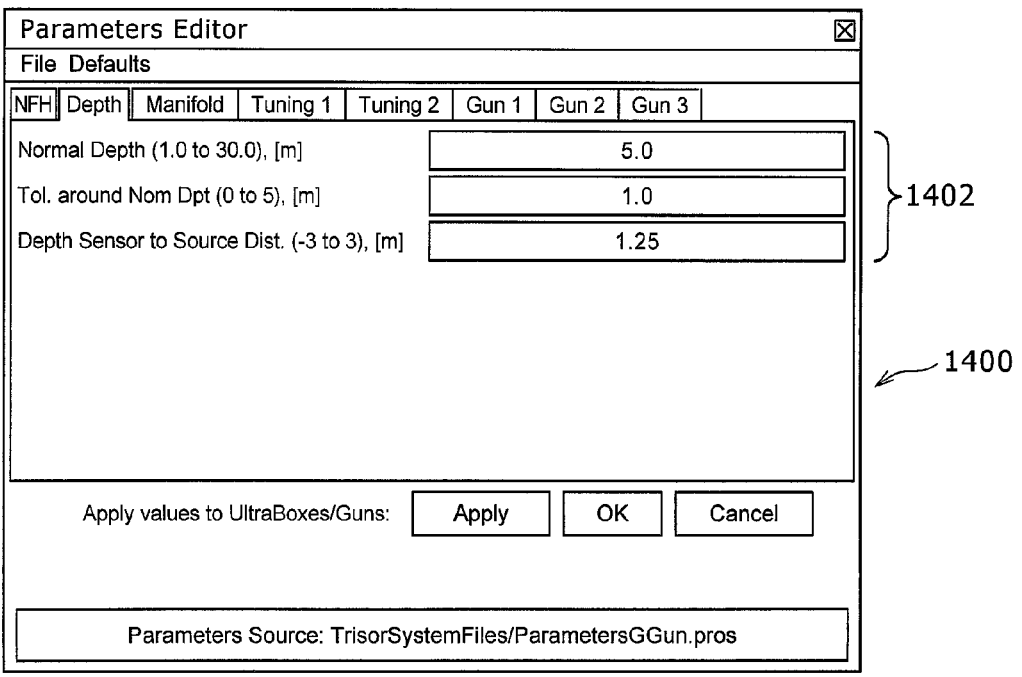

FIG. 14 shows a specific embodiment of a GUI 1400 which may be used for remotely modifying source depth sensor parameters such as, for example, nominal depth, tolerance around nominal depth, and distance from depth sensor to signal source, etc.

Figure 15:
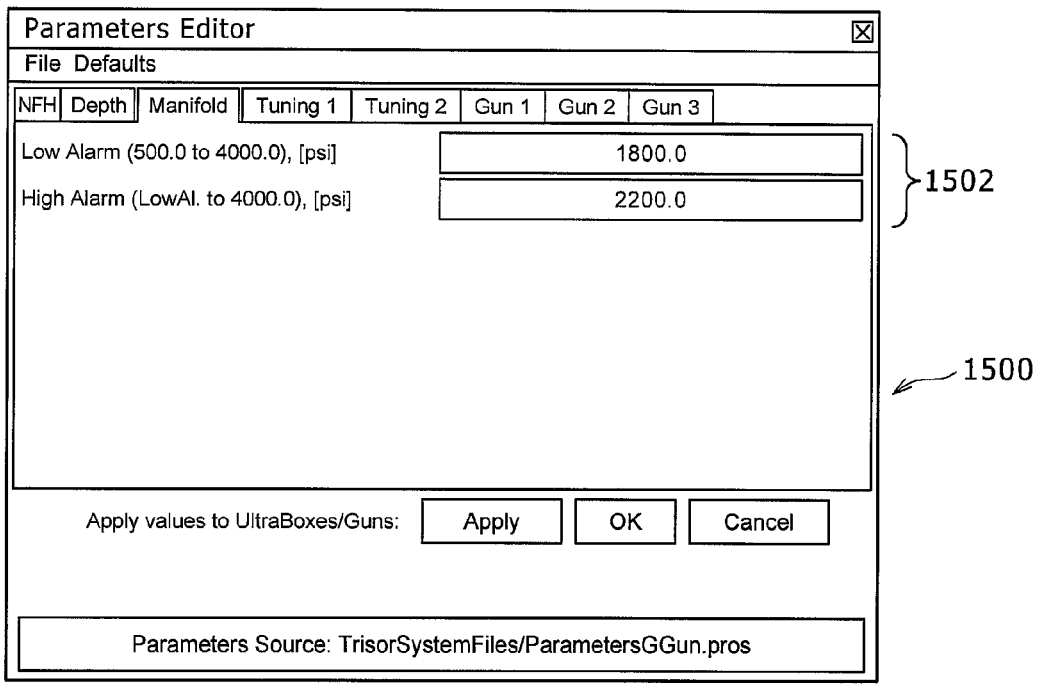

FIG. 15 shows a specific embodiment of a GUI 1500 which may be used for remotely modifying manifold sensor parameters such as, for example, low pressure alarm, high pressure alarm, etc.

Figure 16:
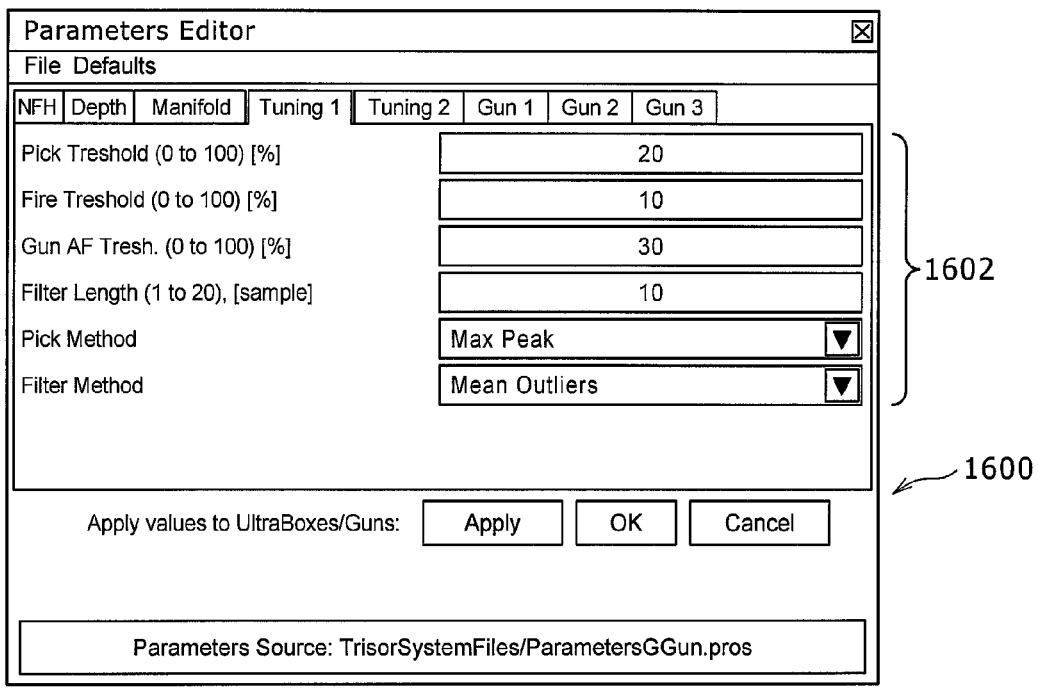

FIG. 16 shows a specific embodiment of a GUI 1600 which may be used for remotely modifying source signal tuning parameters such as, for example, pick threshold, fire threshold, gun AF (Auto Fire) threshold, filter length, pick method, filter method, etc.

Figure 17:
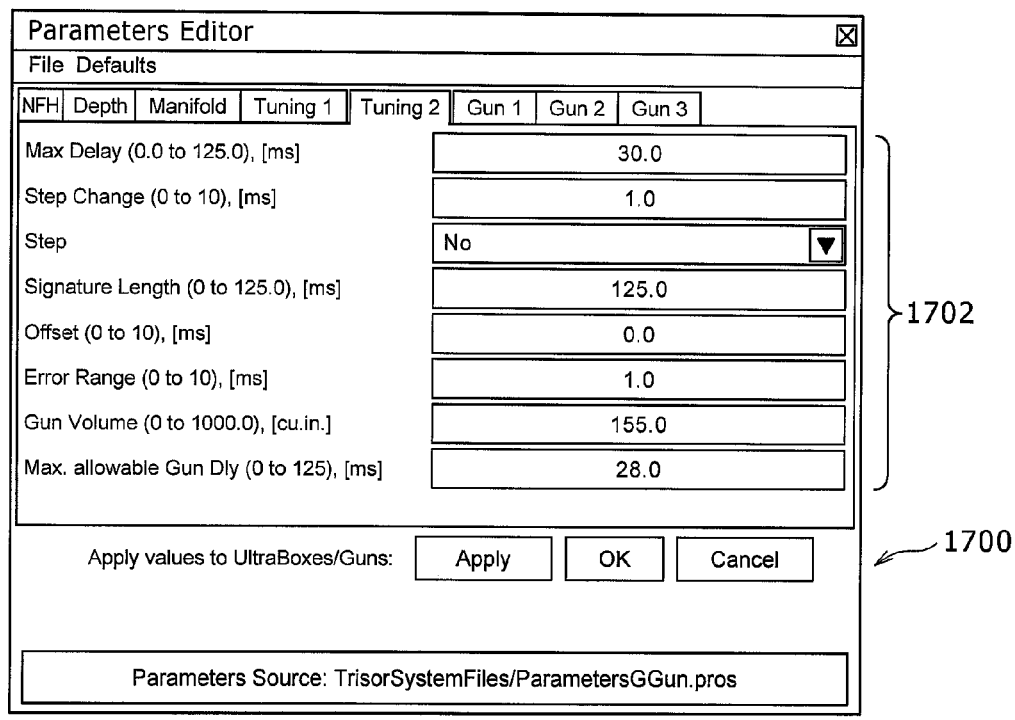

FIG. 17 shows a specific embodiment of a GUI 1700 which may be used for remotely modifying additional source signal tuning parameters such as, for example, max delay, step change, step toggle, signature length, offset, error range, gun volume, max allowable gun delay, etc.

Figure 18:
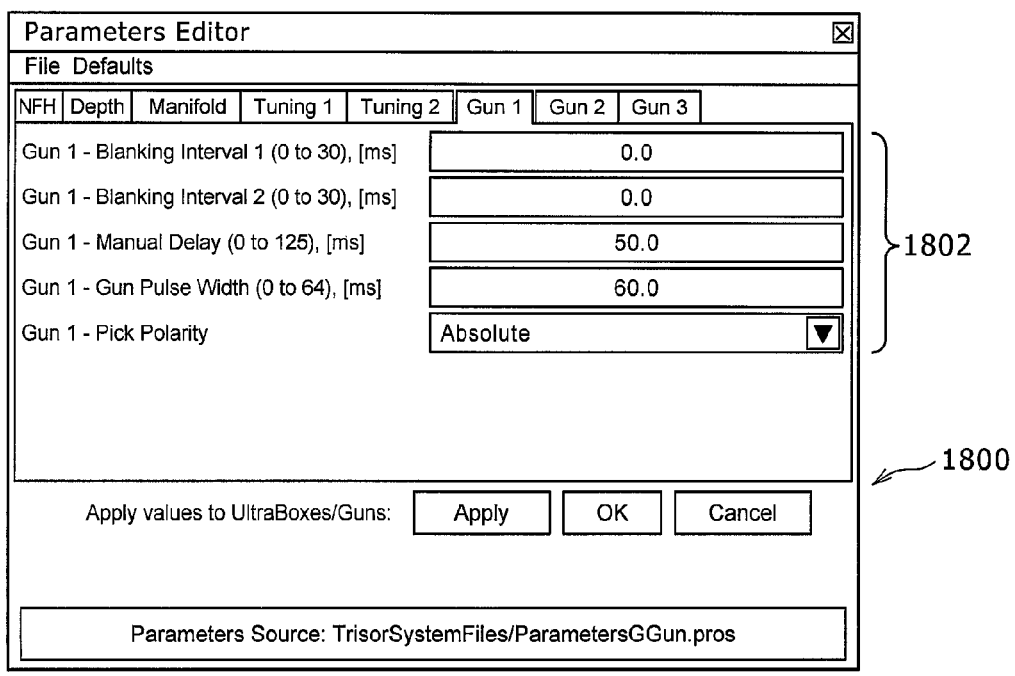

FIG. 18 shows a specific embodiment of a GUI 1800 which may be used for remotely modifying selected source signal device (e.g., gun) parameters such as, for example, blanking interval, manual delay, gun pulse width, pick polarity, etc.

Figure 19:
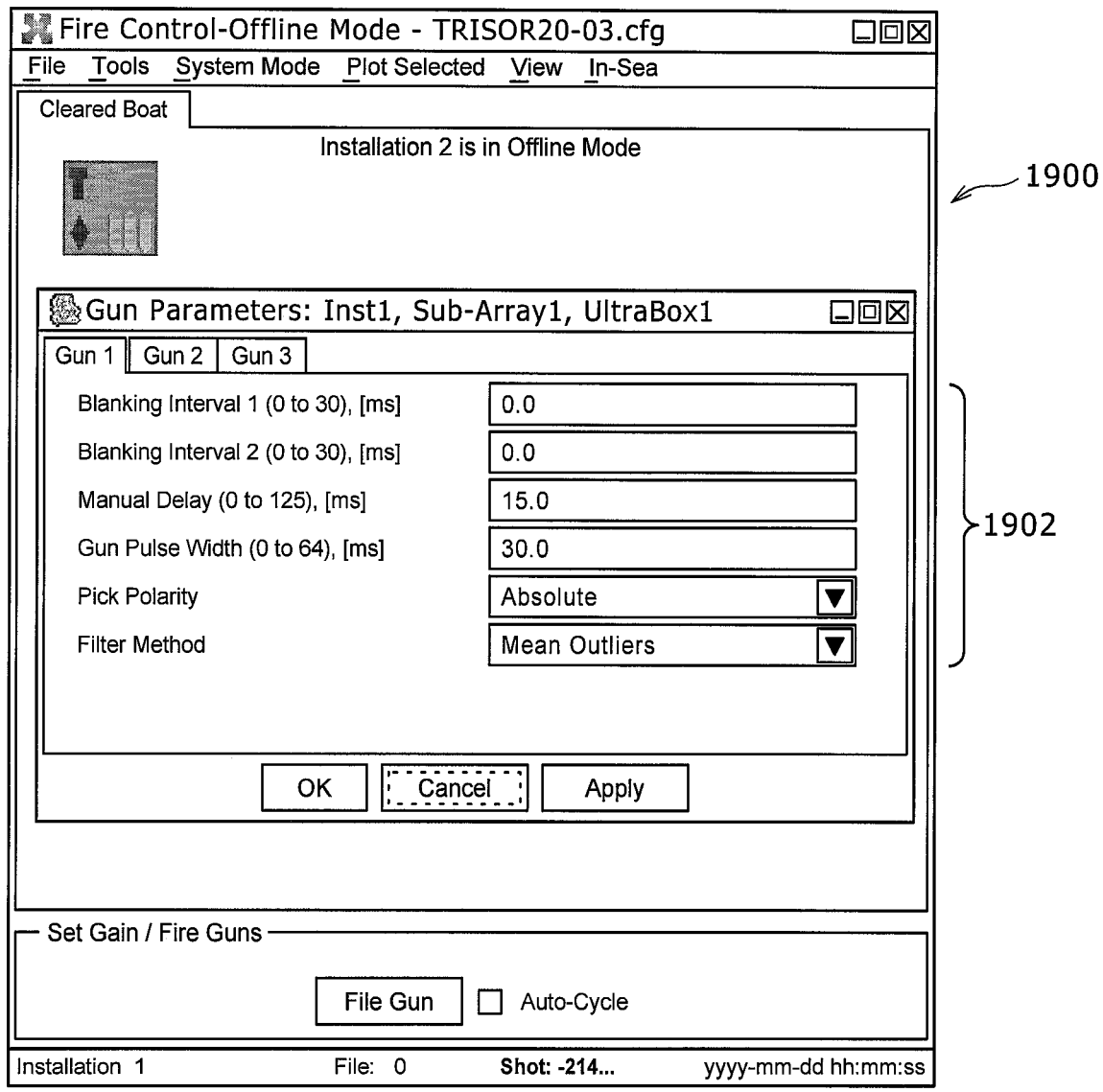

FIG. 19 shows a specific embodiment of a GUI 1900 which may be used for remotely implementing manual tuning of source signal device (e.g., gun) parameters such as, for example, blanking interval, manual delay, gun pulse width, polarity selection, filter method, etc. According to one embodiment, the parameter values for the manual tuning of the source signal device may be manually entered into the appropriate boxes of the manual tuning GUI 1900. Alternatively, in at least one embodiment, computer implemented software and/or hardware may be used to automatically suggest parameter values for the manual tuning of the source signal device. For example, in one implementation, when a user at the master system attempts to perform manual tuning of a gun located at the boat-side system, a dialog box may be designed to pop up and suggest at least one preferred value for the parameter to be adjusted. The user may then choose to reject the suggested value(s), or, alternatively may choose to accept the suggested value. This feature of providing computer implemented suggestions of desired values is advantageous in that it facilitates manual tuning of source signal devices even in situations, for example, where there are source time break sensor device failures. In a specific implementation, the suggested values may correspond to preferred default values, previously known actual working values, etc.

The following example is intended to help illustrate of various aspects may be used to overcome problems encountered during offset seismic survey measurement operations. In this example, it is assumed that a seismic engineer stationed at the rig (100, FIG. 1B) is monitoring the display of QC analysis information at the rig-side seismic survey computer system. Further, it is assumed that the wireline tool control system reports detection of the occurrence of a gun tuning error for Gun#1 which is associated with the boat-side seismic survey system. In this example, there is a high degree of noise on the sensor signal for Gun#1. In order to reduce or eliminate such noise, the engineer may use the master system to access the slave system in order to change the operating mode at the slave system to Safe mode, and then use the Fire Control Window GUI to change the blanking interval parameters for Gun#1. Thereafter, the engineer may switch the operating mode of the slave system to Offline mode, and then manual fire Gun #1 in order to determine whether the noise condition has improved. Once the tuning error (e.g., noise condition on Gun#1) has satisfactorily improved, the engineer may then switch the operating mode of the slave system to Online mode, and then continue with subsequent seismic survey measurement operations.

Figure 8:
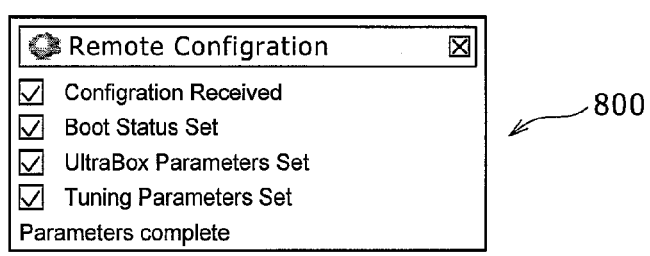
FIG. 8 shows an example of a Remote Configuration Dialog Window 800.

According to a specific embodiment, a System Configuration Window may be provided for enabling a user at the master system to create and transmit configuration files and/or parameter adjustment information for use at the slave system. During the transfer of the configuration files and/or parameter adjustment information from the master system to the slave system, a separate Remote Configuration Dialog Window may be displayed for monitoring the status or progress of the master/slave synchronization. An example of a Remote Configuration Dialog Window is illustrated in FIG. 8 of the drawings. As illustrated in the example of FIG. 8, checkboxes in the Remote Configuration Dialog Window may be automatically checked upon the completion of specific tasks. In this way, the user may be notified, in real-time, of the current status of the master/slave synchronization. In at least one embodiment, an Error Window may be provided for displaying error messages and/or status messages reported by the TPMs (Trisor Processor Modules) and/or other hardware/software in the seismic survey systems.

According to a specific embodiment, the method of communication between the master source control system and the slave source control system may be controlled from either the master or slave from the Main Window of the GUI. In at least one implementation, the Main Window of the GUI may be configured as the main application in the source control system. This application may store desired data and communicates with the local and remote database(s). It may also communicate with the remote-side systems and other GUI applications.

Additional techniques relating to source control for borehole seismic survey systems are described in commonly assigned, co-pending U.S. patent application Ser. No. 10/439,904, entitled "Methods And Apparatus Of Source Control For Borehole Seismic", filed on May 16, 2003, naming John Tulett as the inventor. That application is incorporated herein by reference in its entirety for all purposes.

Generally, the remote source signal and seismic survey system control techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system. In one implementation, the GUI of the present invention may be implemented using JAVA-based software applications.

A software or software/hardware hybrid implementation of the remote source signal and seismic survey system control techniques of this invention may be implemented on a general-purpose programmable machine selectively activated or reconfigured by a computer program stored in memory. Such programmable machine may be implemented on a general-purpose network host machine such as a personal computer or workstation. Further, the invention may be at least partially implemented on a card (e.g., an interface card) for a network device or a general-purpose computing device.

Figure 21:
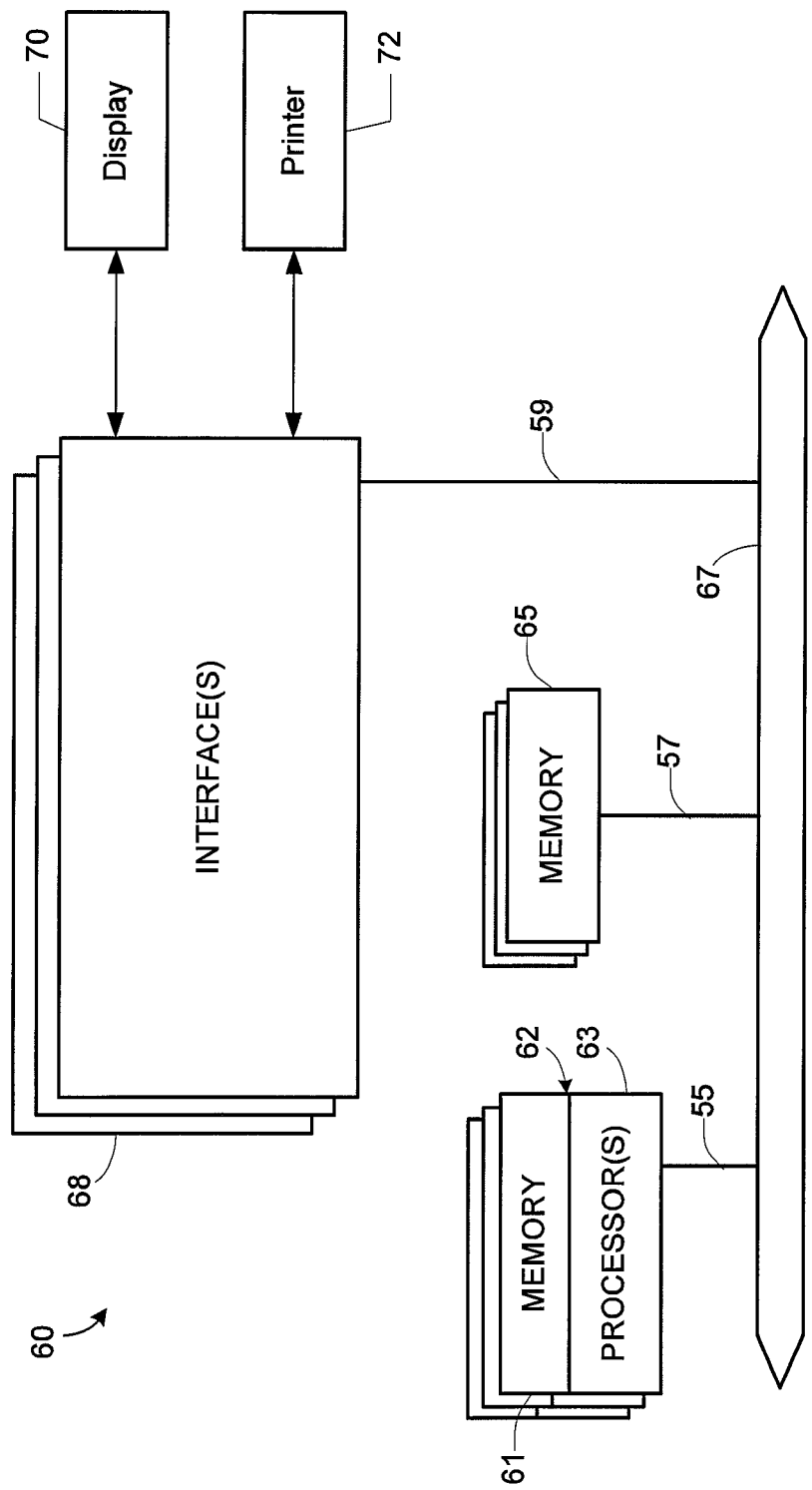
FIG. 21 shows a network device 60 suitable for implementing various aspects of the present invention.

Referring now to FIG. 21, a network device 60 suitable for implementing various aspects of the remote source signal and seismic survey system control techniques of the present invention includes a master central processing unit (CPU) 62, interfaces 68, and a bus 67 (e.g., a PCI bus). When acting under the control of appropriate software or firmware, the CPU 62 may be responsible for implementing specific functions associated with the functions of a desired network device. For example, when configured as a general-purpose computing device, the CPU 62 may be responsible for data processing, media management, I/O communication, calculating the geophone response parameter values, performing geophone response compensation operations, etc. The CPU 62 preferably accomplishes all these functions under the control of software including an operating system (e.g. Windows NT), and any appropriate applications software.

CPU 62 may include one or more processors 63 such as a processor from the Motorola or Intel family of microprocessors, or the MIPS family of microprocessors. In an alternative embodiment, processor 63 is specially designed hardware for controlling the operations of network device 60. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the network device 60, such as, for example, display devices 70 and/or printing devices 72. It will be appreciated that the various remote source signal and seismic survey system control techniques of the present invention may generate data or other information to be presented for display on electronic display devices and/or non-electronic display devices (such as, for example, printed for display on paper).

Examples of other types of interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may be used, for example, to handle data processing tasks, display tasks, communication tasks, media control tasks, etc.

Although the system shown in FIG. 21 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device Regardless of network device's configuration, it may employ one or more memories or memory modules (such as, for example, memory block 65) configured to store data, program instructions for the general-purpose network operations and/or other information relating to the functionality of the remote source signal and seismic survey system control techniques described herein. The program instructions may control the operation of an operating system and/or one or more applications, for example. The memory or memories may also be configured to store data structures, seismic logging information, geophone response parameter information, vibroseis prospecting information, and/or other specific non-program information described herein.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Some aspects contemplate methods and apparatus for use in vertical seismic profile (VSP) and other borehole seismic surveys. The principles described herein facilitate generation of more accurate seismic source information than previously possible, adding precision to seismic data to enable sophisticated seismic data processing. Some methods and apparatus described herein may be implemented to correct or compensate for variations in marine conditions, and/or provide for synchronization between source firing, downhole seismic receiver recording, and (optionally) surface seismic receiver recording. However, while the methods and apparatus are shown in marine implementations, they may also be used for land applications.

Some methods and apparatus facilitate better seismic data analysis by more accurately providing source signatures. More accurate source signatures are a result of a source control system described below which may, for example, vary seismic source firing to coincide with an absolute height for repeated shots or every shot in a marine application. Sea swells and tidal variations can introduce noise to seismic data and render it difficult or impossible to estimate the source signature. For example, sea swells of 3 m can lead to a 2 ms time displacement due to the potential differences in vertical displacement of a buoyed source. Larger swells can have an even more significant effect. For example, when shots are stacked during a rig-side VSP or an offset VSP, the change in travel time for each shot results in smearing of the seismic signals received during stacking and a loss of high frequencies. In fact, because of the noise that can be created by rough seas, marine surveys have previously been limited to conditions when sea swells are something less than approximately 3 to 4 m. Similarly, sea swells, tidal variations, and other phenomena can have an effect on transit time accuracy. Without the compensation methods and apparatus taught herein, seismic signals received during stacking are smeared and transit time measurements are inaccurate when sea conditions vary.

Figure 22A:
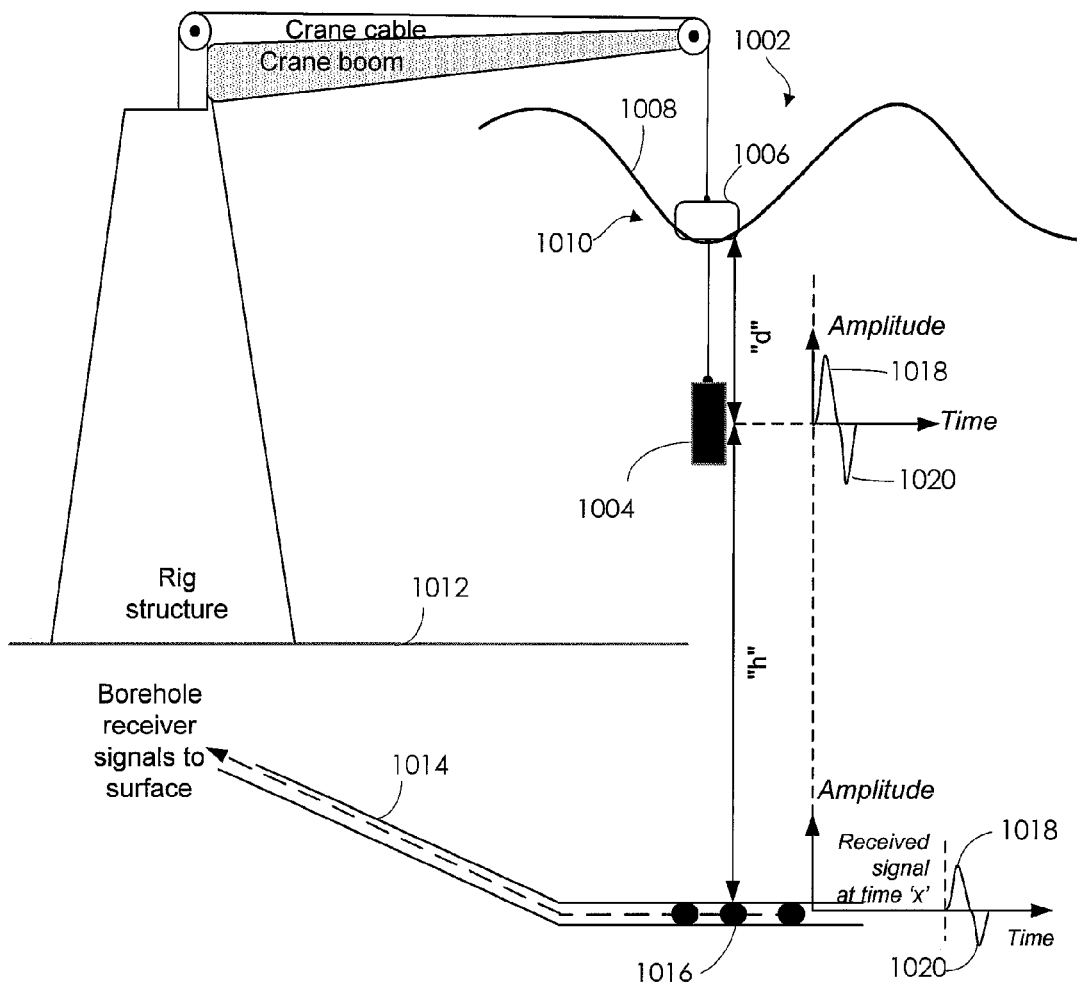
FIG. 22A is a simplified view of an offshore rig positioned over a borehole containing a plurality of receivers. The rig is shown supporting a survey apparatus with a float in a wave trough.
Figure 22B:
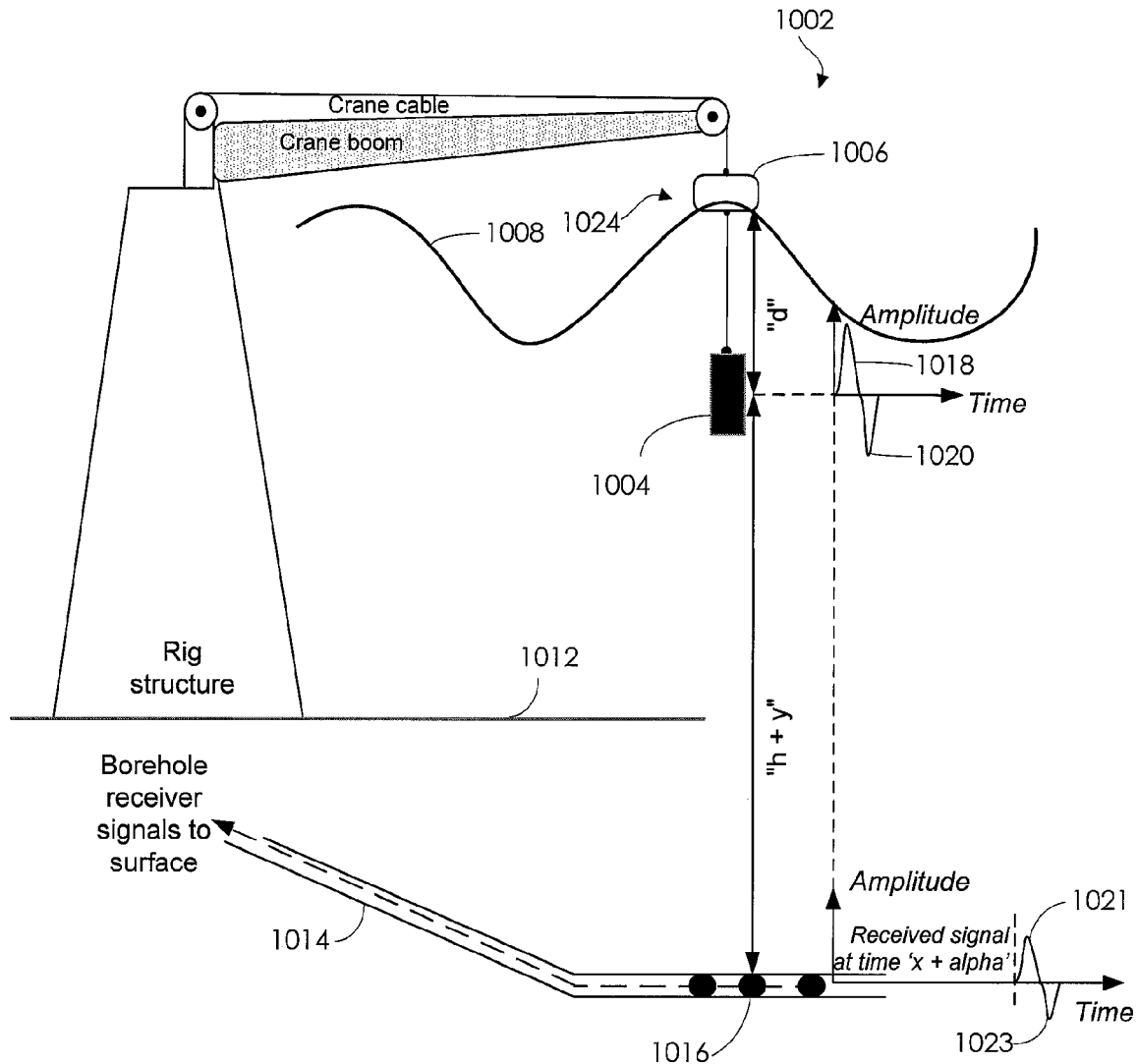
FIG. 22B is a simplified view of the offshore rig positioned over a borehole containing a plurality of receivers as shown in FIG. 22A. However, in FIG. 22B the rig is shown supporting a survey apparatus with a float at a wave peak.

FIGS. 22A-22B illustrate the problems described above with regard to smearing and transit time inaccuracies presented by variations in marine conditions. As shown in FIG. 22A, a seismic measure system 1002 may includes a seismic source 1004 suspended below a float 1006 a distance "d" from a sea surface 1008. The distance "d" remains between the float 1006 and the seismic source 1004 is constant, but the absolute height of both the float 1006 and therefore the seismic source 1004 change with the height of the sea surface 1008. "Absolute" height means a height measurement that is independent of arbitrary standards. Absolute height may be measured, for example from a same, fixed reference point such as the center of the earth. Absolute height is not relative to other heights that might change. Just as "absolute" temperature, pressure, and humidity (for example) are independent of any local or relative measurement, absolute height as used herein may be considered in reference to a single point of origin (such as the center of the earth). Therefore, the absolute height of the seismic source 1004 suspended from a float 1006 on the sea surface 1008 changes as the sea surface rises and falls. However, the position of a sea floor 1012, a borehole 1014, and receivers 1016 in the borehole 1014 is fixed and absolute and does not change with variations of the sea surface 1008.

FIG. 22A illustrates the float 1006 in a trough 1010) of the sea surface 1008. The seismic source 1004 suspended from the float 1006 is a height "h" above the receivers 1016 in the borehole when the float 1006 is in the trough 1010. If the seismic source 1004 is fired at time zero (0), a source signal 1018 and source ghost signal 1020 are generated. The source signal 1018 and source ghost signal 1020 are received by the receiver 1016 at time "x". Time "x" is based on the speed of sound in the sea, the speed of sound in the earth formation, and the distance "h." FIG. 22B illustrates the float 1006 at a different time such that the float 1006 is located at a peak 1024 of the varying sea surface 1008. The seismic source 1004 is still suspended from the float, and the distance between the float 1006 and the seismic source 1004 remains "d." However, the seismic source 1004 is now a height "h+y" above the receivers 1016. The additional "y" distance is a measure of the change in sea surface height 1008 due, for example, to waves (but could also be due to variations in tide). If the seismic source 1004 is fired at time zero (0) again, the source signal 1018 and the source ghost signal 1020 are received by the receiver 1016 at time "x+alpha." It takes "alpha" time longer for the seismic source signal 1021 and the source ghost signal 1023 to travel through the additional distance "y" of water. Thus, transit times can vary due to changes in the sea surface 1008 conditions and lead to smearing and inaccurate results. However, according to principles described herein, controllers repeatedly fire seismic sources at a same absolute height (for example at height "h" of the seismic source(s) 1004 above the receivers 1016) so that transit times are based on signals traveling the same distance. In some embodiments, controllers fire seismic sources only at the same absolute height of the seismic source(s).

Figure 23:
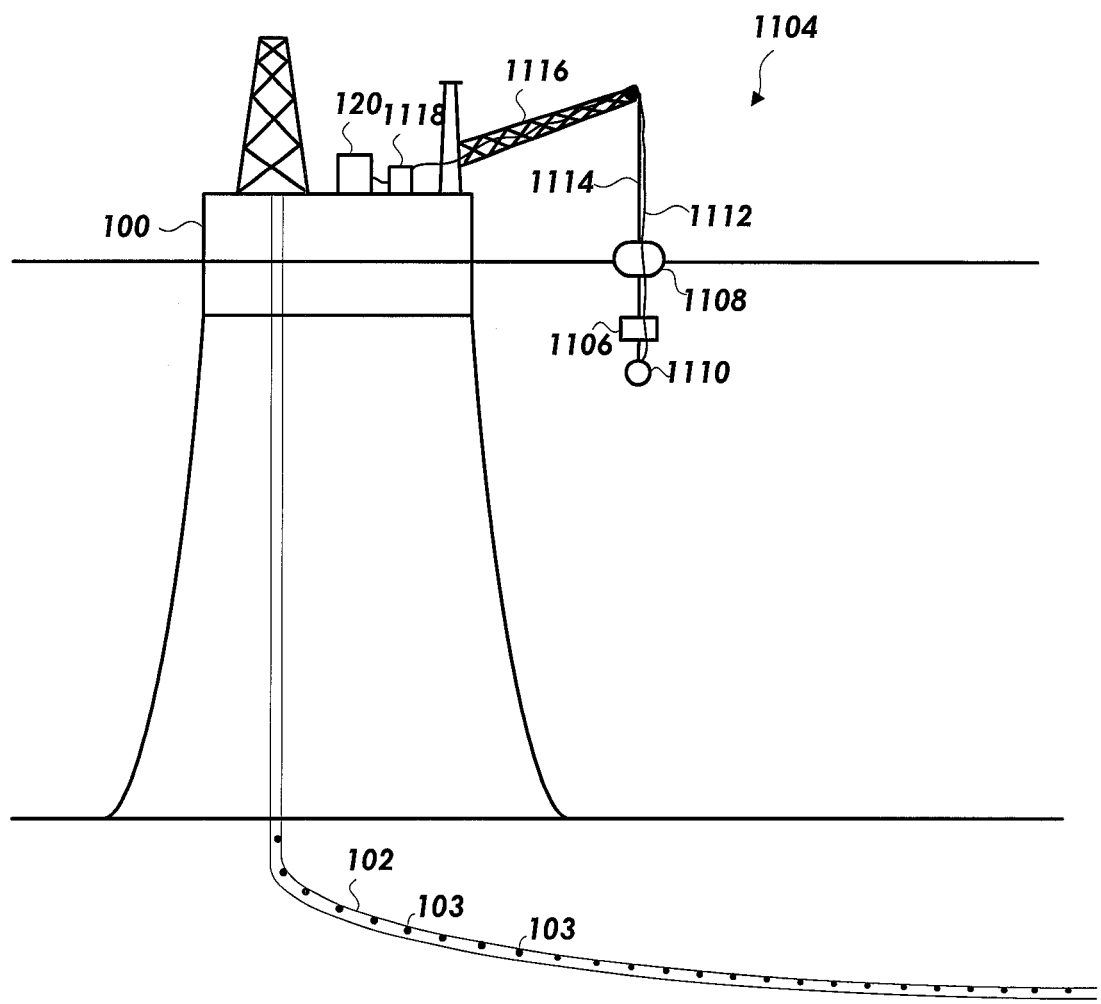
FIG. 23 is a simplified view of an offshore rig positioned over a borehole containing a plurality of receivers. The rig is shown supporting a conventional seismic survey apparatus.

Turning now to FIG. 23, a simplified view of an offshore rig 100 positioned over a subsea borehole 102 is shown. The borehole 102 contains a plurality of spaced receivers 103 to facilitate, for example, a VSP acquisition. The rig 100 is shown supporting a conventional seismic survey apparatus designated generally as 1104. The survey apparatus 1104 includes an air-gun or guns 1106 suspended below the surface by a float 1108. An analog hydrophone 1110 is suspended below the air-gun 1106. As discussed above, the hydrophone 1110 can provide partial information for correcting time break errors (errors attributable to time differences for swells, irregular source firings, etc.) but not enough information for shot deconvolution. The hydrophone 1110 of the typical survey apparatus 1104 is not automatically calibrated and therefore dependent on the user, which often changes.

One or more analog lines 1112 form part of an umbilical 1114 that may also include an air line. The analog lines 1112 traverse a handling system, such as a crane 1116. The analog lines 1112 provide an analog communications/control link between the guns 1106, the hydrophone 1110, a gun controller 1118, and a computer processor 120. The gun controller 1118 is arranged on the rig 100, far removed from the guns 1106. Currently the lack of a display at the gun controller 1118 or the computer processor 120 of the hydrophone readings or the air gun depth or pressure at the gun creates operational shortcomings. In addition, disconnection of the analog lines 1112 while the air gun is powered can result in inadvertent firing of the air-gun 1106 that may pose a safety hazard.

Therefore, according to the conventional arrangement of FIG. 23, seismic data quality is compromised. The position (referring primarily to depth) of the guns 1106 is dependant on rig movement, waves, crane operation, and/or other factors. Prior to the teachings described herein, there has been no compensation or correction for changes in depth, no compensation for changes in air pressure, very limited ability to time the firing of the guns 1106, and therefore the source signature of the guns 1106 and the wave amplitude are far from optimal.

Figure 24:
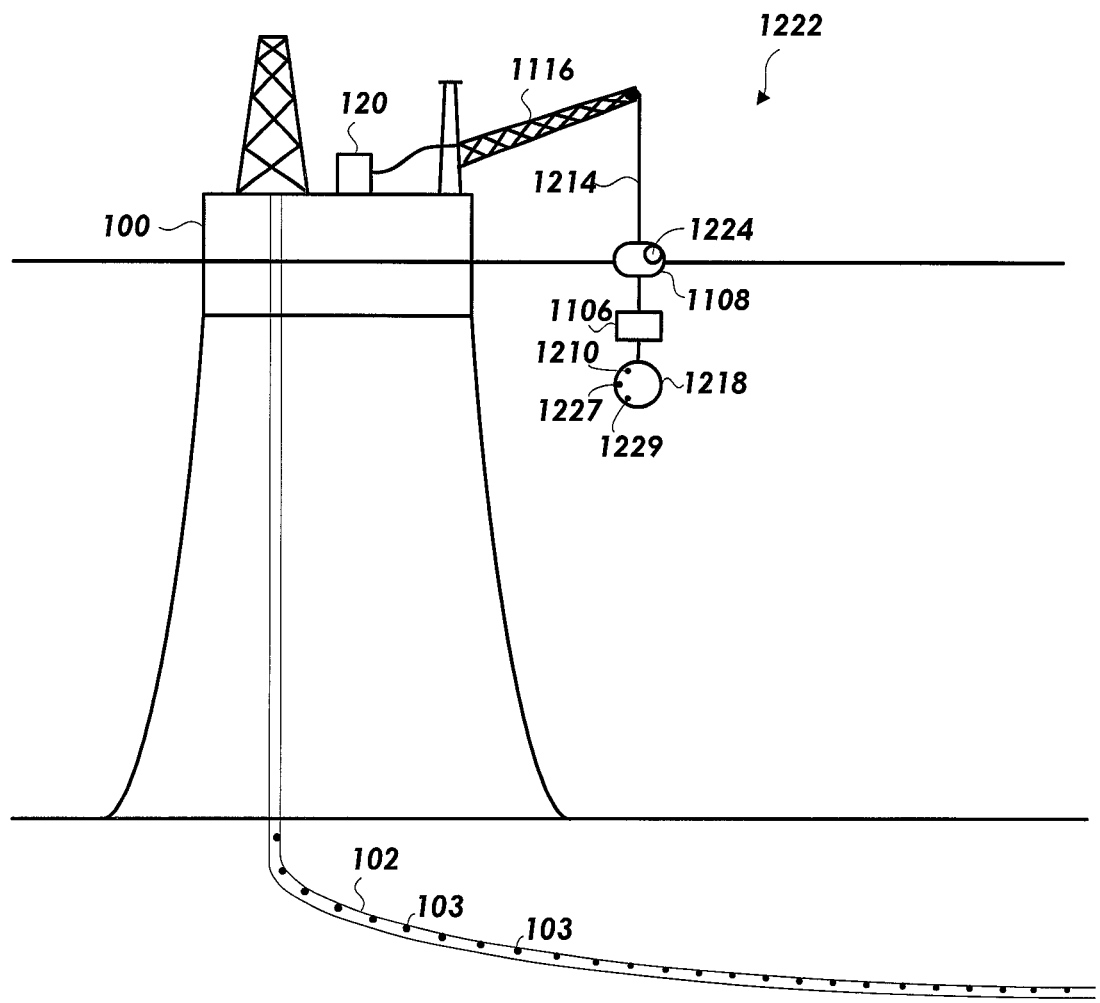
FIG. 24 is a simplified view of an offshore rig positioned over a borehole containing a plurality of receivers. The rig is shown supporting a seismic survey apparatus with a source control system according to one aspect of the present invention.

However, a source control system according to one aspect of the invention illustrated in FIG. 24 facilitates much more accurate seismic data. According to the arrangement of the FIG. 24, there is also an offshore rig 100 positioned over a subsea borehole 102 containing a plurality of receivers 103. The rig 100 is shown supporting the source control system and designated generally as 1222. The rig 100 may be replaced, according to some embodiments, with a movable vessel. The source control system 1222 includes a seismic source, a handling system, an umbilical 1214, and an in-sea source controller 1218 for controlling the firing of the seismic source. The source control system 1222 and the borehole receivers 103 may be integrated to provide a borehole survey system.

According to the embodiment of FIG. 24 the seismic source is the air-gun 1106, which may be a single gun, an array of guns, or any other arrangement. The handling system includes a crane 1116 and associated apparatus to facilitate the deployment and retrieval of the source control system 1222 and air gun 1106. The umbilical 1214 includes an air supply, which is operatively connected to a compressor. The compressor is preferably located on the rig 100. However, unlike the typical survey apparatus with long analog communication lines, the umbilical 1214 of the source control system 1222 according to FIG. 24 includes only digital communication lines between the in-sea source controller 1218 and the processor 120 on the rig 100. The use of digital lines eliminates any crosstalk, signal leakage, and the potential for an inadvertent gun firing upon removal of the communication links. As mentioned above, the air gun 1106 is controlled by the in-sea controller 1218 and generates seismic waves that are received by the borehole receivers 103 to generate, for example, a VSP survey.

The source control system 1222 may also include an attached float 1108 to buoy the air gun 1106, the in-sea controller 1218, and any other in-sea apparatus. The float 1108 may advantageously include a navigational system or motion sensor, such as a Global Positioning System 1224 (GPS). GPS systems are readily available from a variety of sources. The GPS system 1224, among other things, facilitates detection of changes in absolute height (due, for example, to waves or changes in tide). As mentioned above with reference to FIGS. 22A-22B, firing the air guns 1004 at different absolute heights or different heights with respect to borehole sensors can adversely affect the determination of the source signature of the air gun 1106 and/or other data (e.g. transit times) collected by the borehole receivers 103. Accordingly, the GPS system 1224 feeds position information to the processor 120 and/or the in-sea source controller 1218 so that the air-gun 1106 may be fired repeatedly at and/or only at certain absolute heights. The firing of the air gun 1106 at certain absolute heights may be controlled by a switch or other mechanism associated with the GPS system 1224 or the in-sea controller 1218, such that the air-gun is automatically fired at an absolute height (e.g. a fixed height relative to receivers in a borehole or a fixed height above the center of the earth). Conventional marine surveys fire air-guns at regular time intervals, regardless of absolute height. The addition of a motion sensor according to principles described herein increases the accuracy of the source signature determination, discussed in more detail below.

In addition to providing position information, the GPS system 1224 may also receive and broadcast a time standard to the in-sea controller 1218, the processor 120, and/or any navigation subsystems that may be used with source control system 1222. This time standard may, for example, be Universal Time Coordinated (UTC). The UTC time standard may be supplied to various survey subsystems to synchronize the firing of the air guns 1106 with the recording of data by the borehole receivers 103. According to some embodiments, there may also be surface receivers, the recording of which may also be synchronized with air gun 1106 firing using the time standard provided by the GPS system 1224.

Further, according to some embodiments, the in-sea source controller 1218 may include one or more in-sea sensors providing signals to enable, among other things, source signature estimation. Preferably, the in-sea sensors are located at the in-sea source controller 1218 and maintain a fixed geometry relative to the air gun 1106 or other seismic source. The one or more in-sea sensors may include, but are not limited to: a calibrated digital hydrophone 1210, a depth sensor 1227, and an air pressure sensor 1229. The one or more in-sea sensors may also include short analog communication lines to the in-sea source controller 1218, where the signals may be digitized at the source for relay to the processor 120. Therefore, according to the embodiment of FIG. 24, if the source control system 1222 includes analog lines, those lines are relatively short, instead of the very long analog lines found in previous survey systems that extend all the way from the seismic source to the rig. The hydrophone 1210 according to the present invention provides improved fidelity of a near field signal because it is calibrated in-sea and digitized at the seismic source. In addition, the air pressure sensor 1229 monitors air pressure supply at the air-gun source and reports firing pressure variations which can be taken into account when determining the source signature. Accordingly, the seismic source signature may be more accurately estimated by accounting for timing variations, hydrodynamic variations, pressure supply variations, etc., using the calibrated digital hydrophone 1210 signal and air pressure readings at the seismic source.

Estimation of an accurate source signal is highly important to VSP processing. The source signal enables separation of the upgoing and downgoing wavefields. Inconsistent source signatures result in residuals in collected data by the multichannel velocity filters used to separate wavefields. These residuals are effectively "noise" and can cause significant distortion to the processed results. With an ever-increasing focus on true amplitude and time-lapse borehole seismic measurements, source signature consistency is very important to VSP surveys. Good source signature estimation using the methods and apparatus taught herein increase the consistency of the source signature. Likewise, inaccurate or smeared transit times as described above can be reduced or eliminated by adhering to the principles described herein.

Calibrating the source signatures has in the past been accomplished by visual quality checks. These visual checks include, for example, looking for air guns that did not fire and ensuring the frequency response covers both low and high ends. Such checks are somewhat subjective, however, and even more so if the air-gun 1106 reference far field source signature is unknown. According to the present embodiment having the in-sea source controller 1218, however, the air-gun 1106 source reference far field signatures are on file at the well site, so the source control system 1222 can be programmed to automatically check the measured source signature against the reference source signature. By performing an automatic check, there is an assurance that for each well site setup the air-gun 1106 source signature meets its performance acceptance criteria. Calibrated and consistent source signatures are important for evaluating the subsurface changes in time-lapse surveys. With a calibrated source signature, variations in seismic reflections will be representative of subsurface changes, instead of changes in the source signature.

Seismic source signatures for VSP must be surface referenced, and if there is a change in datum level (e.g. as the air-gun 1106 rises and falls in a rough sea), there will be small 1 or 2 ms time shifts. However, the changes in datum level may be eliminated or compensated for by using the GPS system 1224 or other motion sensing equipment. Further, heretofore tidal corrections have not been made for borehole seismic measurements. While failing to make tidal corrections may be acceptable for deep-water surveys, depending on the time of day and the strength of the tide, there may be a significant effect on transit times in coastal areas. Therefore, according to some embodiments the source control system 1222 includes an absolute height or depth sensor 1227 to monitor the absolute height of the air gun 1106 (which is below the water surface). The height or depth sensor 1227 may be, for example, a commercially available bathymetry sensor. Variations in tide may then also be accounted for according to principles described herein. In addition, the air-gun 1106 may be automatically disabled if the height or depth sensor 1227 reports a depth less than or greater than (i.e. different from) a predetermined level. The attributes reported by the in-sea sensors may be automatically displayed at the processor 120 for a user to see.

In one embodiment, the configuration of the air-gun 1106 may be an array or cluster arrangement, such as a three-gun cluster. However, any other air-gun arrangement may also be used. For example, some embodiments may include vertical air-gun arrays of up to eight guns or more. Prior methods are restricted to simultaneous firing of air guns. The digital in-sea controller 1218 in the present invention provides the capability to stagger the firing of an array of air guns 1106, which has previously been unavailable using rig-based analog controllers that lack the tuning flexibility to fire sequentially.

Figure 25:
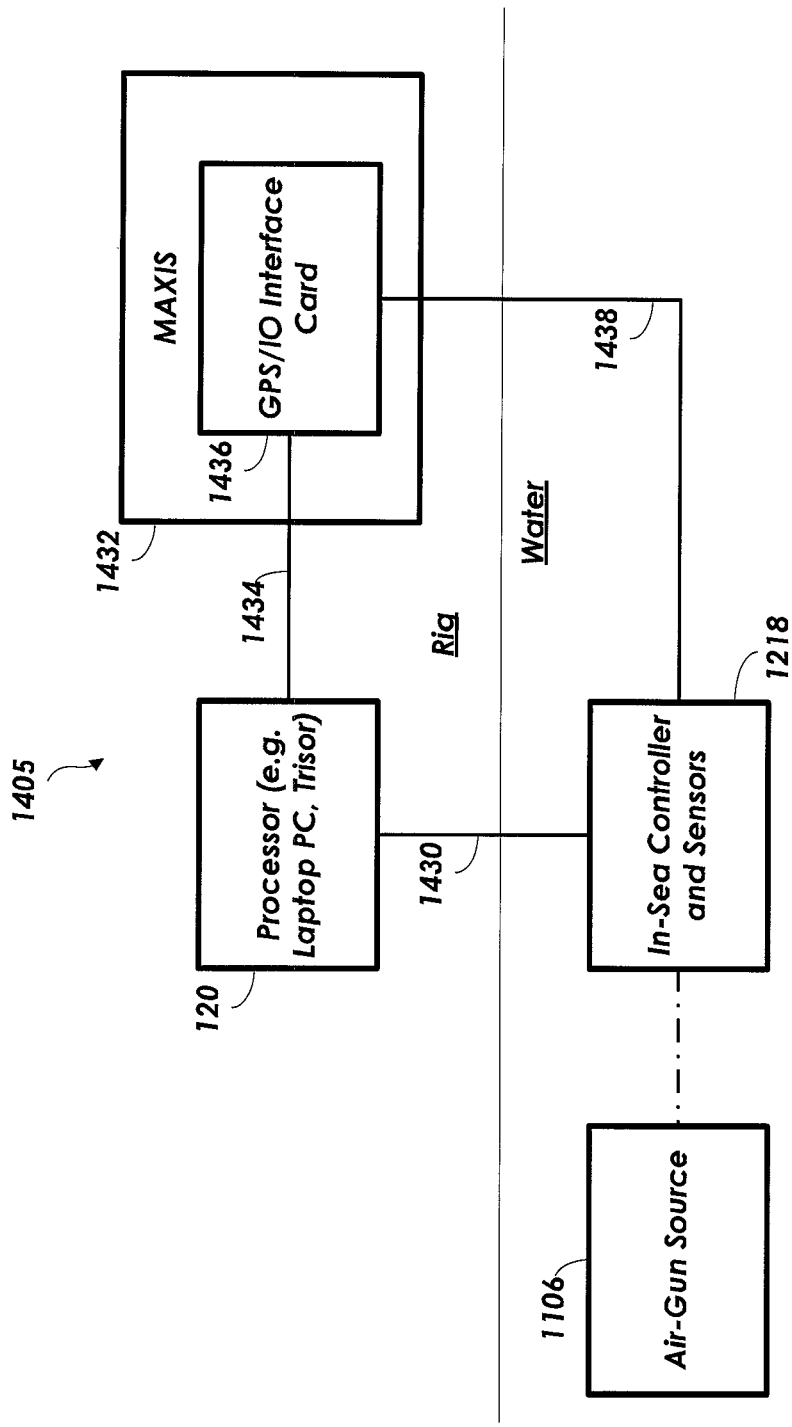
FIG. 25 is a schematic diagram illustrating a source control system according to one aspect of the present invention.

Referring next to FIG. 25, a schematic illustration of one possible source control system 1405 configuration according to aspects of the present invention is shown. As shown in FIG. 25, the processor 120 may be a laptop computer running a digital source control program. The processor 120 may control and/or monitor the in-sea controller and sensors 1218 described above with reference to FIG. 24, which may also include the GPS system (1224, FIG. 24). The communication interface between the processor 120 and the in-sea controller 1218 and sensors 1227, 1229 is preferably a digital link 1430. This digital link 1430 may be used for pre-testing the system in preparation for data acquisition. The processor 1120 may also link with an acquisition and imaging system 1432, for example Schlumberger's MAXIS™ (Multitask Acquisition and Imaging System) system via another digital interface 1434. The acquisition and imaging system 1432 may include a GPS digital data interface 1436 as shown. Alternatively, the processor 120 may contain a GPS digital data interface 1436. The processor 120 and acquisition and imaging system 1432 are located on the rig according to the illustration of FIG. 25, however, as the name suggests, the in-sea controller and sensors 1218 are located in the water adjacent the air-gun 1106 or other seismic source. The in-sea controller and sensors 1218 may also have a digital interface 1438 with the acquisition and imaging system 1432. This direct digital interface 1438 may provide the primary interface with the acquisition and imaging system 1432 during data acquisition. The only analog interface 1440 of the source control system 1405 extends the short distance between the in-sea controller and sensors 1218 and the air-gun source 1106.

Figure 26:
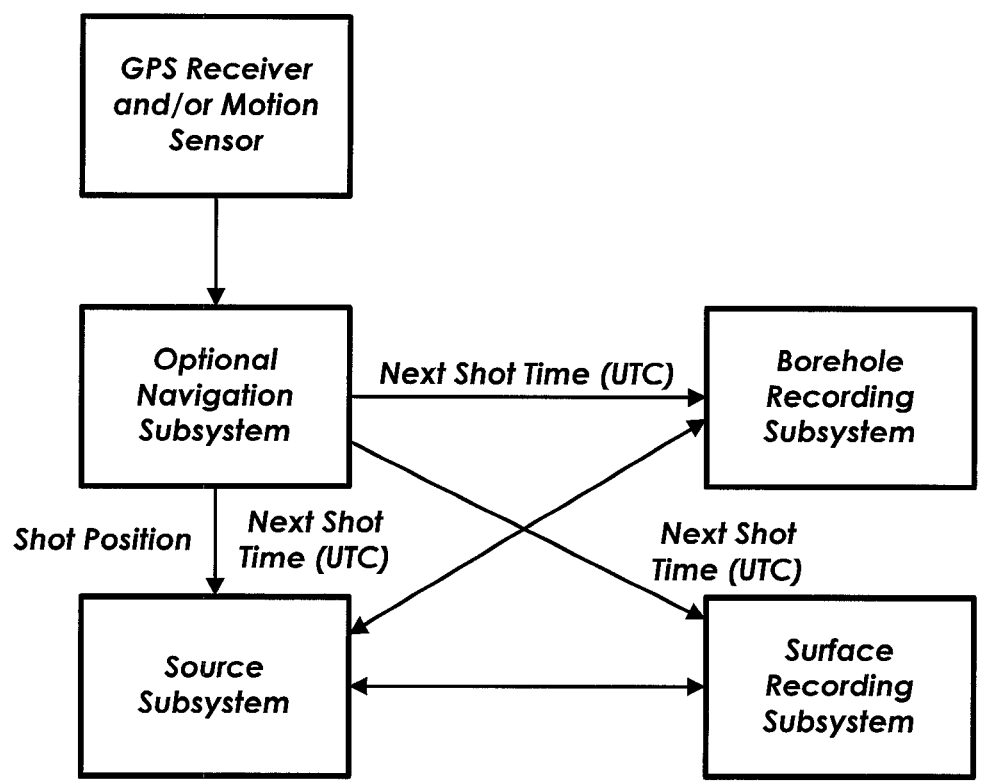
FIG. 26 is a schematic illustration of a source control method according to one aspect of the present invention.
Figure 27:
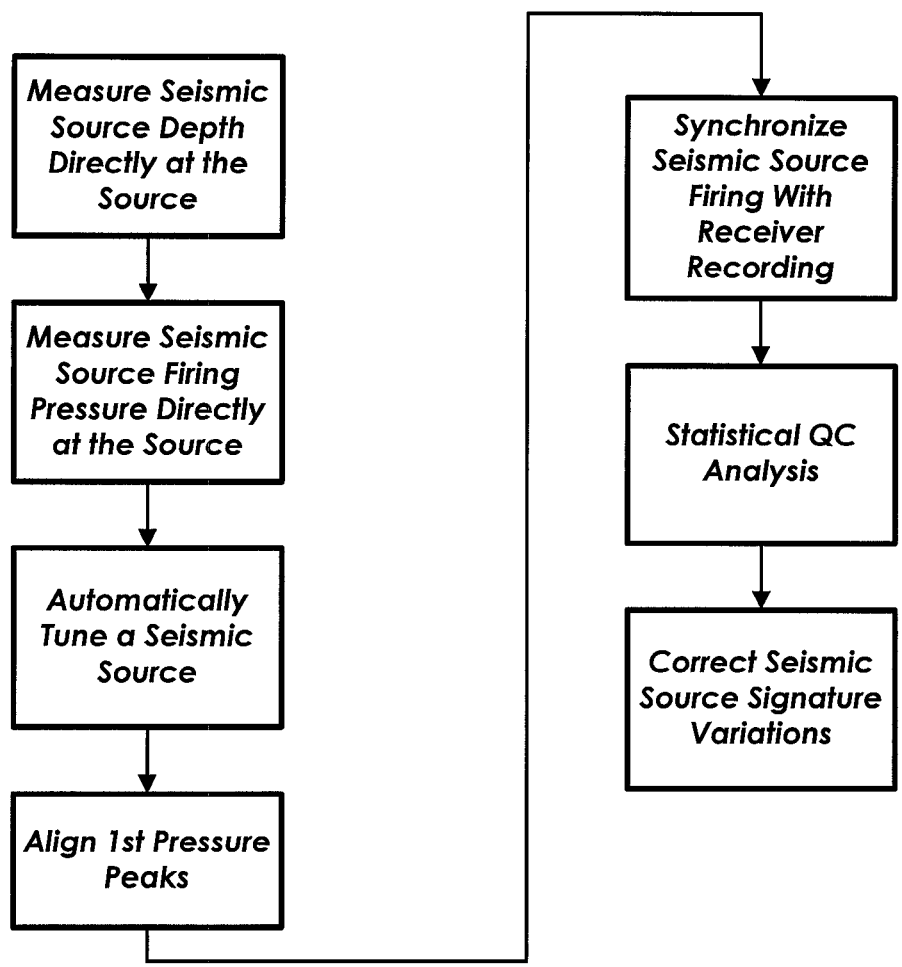
FIG. 27 is a schematic illustration of a source control method according to another aspect of the present invention.

Turning next to FIGS. 26-27 schematic illustrations representing methods of using the source control system 1222 and/or improving a VSP survey are shown. It will be understood, however, that the methods shown and described are not limited to the particular sequences shown, nor must all the steps described be performed. The steps described may be accomplished in any of a number of sequences. According to one method, a seismic source such as an air-gun cluster (FIG. 24) is automatically tuned, for example, by the in-sea source controller 1218. The in-sea source controller 1218 may keep individual air-guns 1106, FIGS. 24-25) firing in synchronization with one another by aligning first pressure peaks detected by the hydrophone 1210, FIG. 24) located adjacent the air-guns 1106, FIGS. 24-25). "First" can, but does not necessarily mean, the pressure peak that arrives first in time. "First" may also mean "one" or "a."

Therefore, according to some embodiments, the in-sea source controller 1218 may tune or synchronize individual air-guns 1218 with one another by aligning the pressure peaks, by aligning low frequency bubble peaks, or by other methods.

Some attempts to reduce the problems with ghosting have focused on programming a fixed delay between the firing of each air gun. Nevertheless, salinity, temperature, depth, bubbles, and other phenomena significantly affect the velocity of a pressure wave through water. Air bubbles generated by the firing of the first air gun may have the most profound affect on the velocity of pressure waves through the water. Accordingly, even a fixed firing delay may result in ghosting (a notch frequency) and inaccurate seismic measurements. Therefore, in some embodiments, each seismic source, such as an air gun, is fired sequentially or staggered to substantially maximize the amplitude of the pressure wave. Substantially maximizing the amplitude yields, among other things, increased bandwidth, a reduction of high-frequency notches and enhancement of low frequencies, reduced susceptibility to rough-sea reflections, and a more omni-directional source pattern.

In some embodiments, the sequential or staggered firing is active or dynamic. The advancing pressure wave is measured for each firing, allowing the firing of each air gun in a staggered array to be adjusted in time to continually align and substantially maximize the amplitude of the downgoing pressure wave.

In one embodiment, air guns are spaced vertically and fired with dynamic time delays to align and/or maximize the amplitude of the downgoing pressure wave while also minimizing sea surface reflection. A staggered air gun array's advancing pressure wave may be measured by an in-sea sensor at each air gun (except for the first air gun, which would not need a time adjustment if it fires first in time, but could have a sensor for other reasons), allowing firing of the next deeper air gun in the air gun array to be adjusted in time to continually substantially maximize the amplitude by superimposition of the pressure waves. In one embodiment, as each air gun in the staggered array is positioned at a corresponding deeper location from a sea surface, the advancing wave continues to be measured and each air gun is fired based on the feedback from sensors detecting the advancing wave. Adjusting the firing of each deeper air gun reduces the ghosting effects related to vertical air gun deployments. Moreover, a synchronization unit may use the in-sea sensor measurements of the downgoing pressure wave to synchronize the staggered array firing with the recording of receivers in the borehole.

Figure 28:
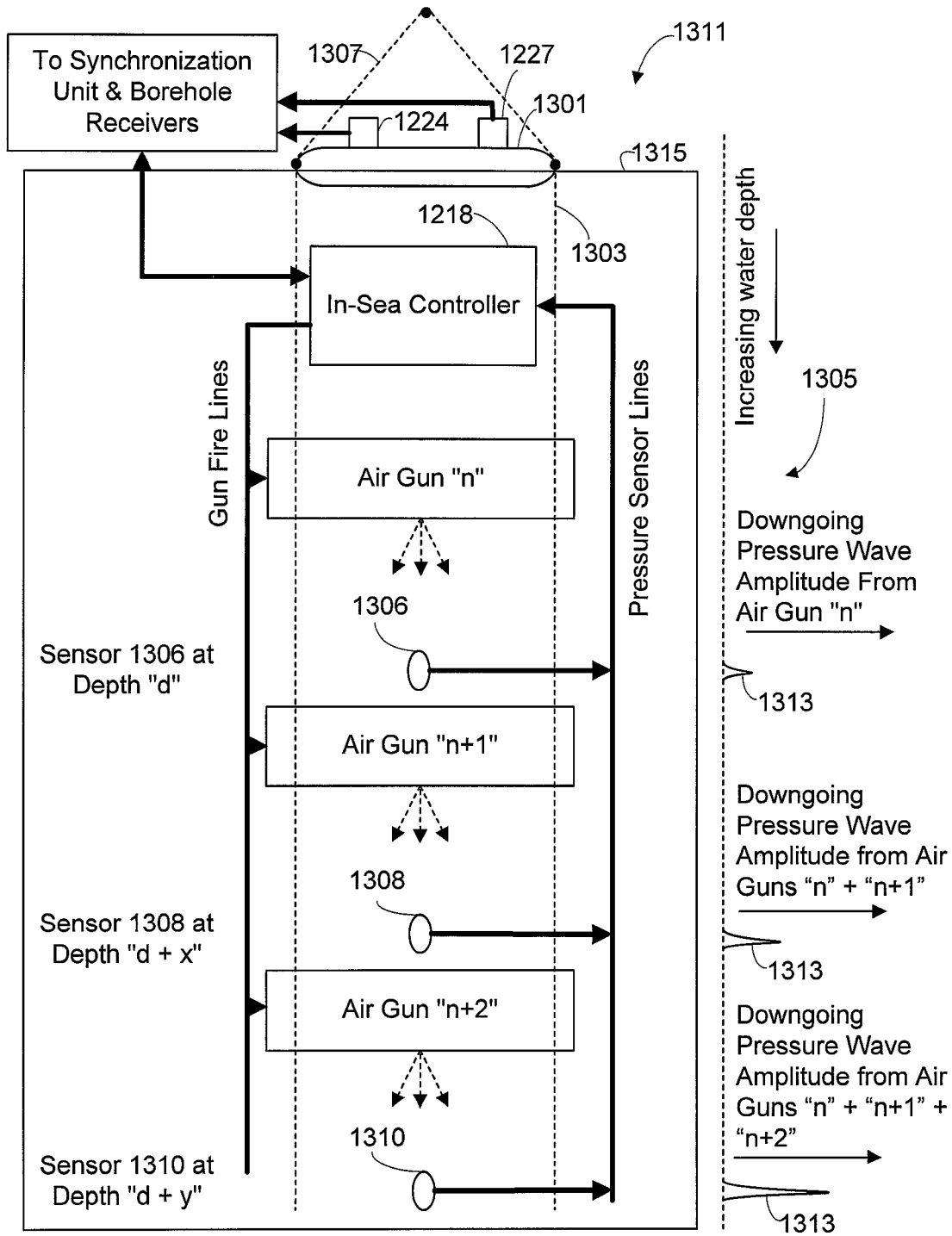
FIG. 28 is a schematic illustration of a seismic survey system according to one aspect of the present invention.

Referring to FIG. 28, a seismic system such as a seismic survey system 1311 may stand alone or be part of a survey apparatus such as the survey apparatus (1222, FIG. 24) described above with reference to FIG. 24. The seismic survey system (1311) of FIG. 28 may replace some or all of the subsea components described above with reference to FIG. 24. The seismic survey system 1311 may comprise a first seismic source such as a first air gun (n) that is closest to a sea surface 1315. The seismic survey system 1311 may also comprise an array 1305 of seismic sources or air guns and therefore include at least a second air gun (n+1) spaced vertically from the first air gun (n). The array 1305 may include any number of seismic sources, including the three shown in FIG. 28. In one embodiment, a first seismic sensor such as a first hydrophone 1306 may be located at the second air gun (n+1). In addition, in one embodiment, a controller, such as the in-sea controller 1218, is operatively connected to the first and second air guns (n, n+1) and the first hydrophone 1306. The in-sea controller 1218 may be replaced by a controller that is not underwater. The air guns (n, n+1, etc.) may be suspended from a float 1301 via hanging chains 1303. The float 1301 may also be attached to lifting chains 1307, which enable deployment and retrieval of the float 1301, in-sea controller 1218, and air run array (n, n+1, etc.). One or more sensors may be disposed on the float 1301, such as the GPS system 1224 and the motion or bathymetry sensor 1227.

The in-sea controller 1218 manages the firing times of each of the air guns (n, n+1, etc.) and receives feedback from the first hydrophone 1306 (and, in some embodiments, additional hydrophones or other sensors). When the in-sea controller 1218 fires the first air gun (n), it generates an advancing pressure wave 1313. The first hydrophone 1306 measures the advancing pressure wave 1313 and communicates advancing pressure wave data to the in-sea controller 1218. The in-sea controller monitors the advancing pressure wave data and staggers the timing of the firing of the next air gun (n+1) based on the feedback from the first hydrophone 1306. Thus, the in-sea controller 1218 may fire the second air gun (n+1) to align and/or substantially maximize the amplitude of the downgoing pressure waves by superimposition. For example, in some embodiments the in-sea controller 1218 fires or is programmed to fire the second (n+1) and subsequent air guns (n+2, etc.) to align a first pressure peak of each seismic source. This routine may continue and be repeated for any number of additional air guns, each of which may have an associated hydrophone. However, the hydrophones can be spaced independently of the air guns as well and still report useful information to the in-sea controller for delayed firing of subsequent air guns.

FIG. 28 illustrates a third air gun (n+2) and an associated second hydrophone 1308 and a third hydrophone 1310 that may be associated with an additional (not shown) air gun. The air guns may be arranged deeper and deeper at constant or varying spacing. Because the in-sea controller 1218 dynamically adjusts firing times of each air gun based on feedback from seismic sensors, the spacing between air guns does not have to be constant, and changes in wave velocity due to bubbles (especially as air guns are fired), salinity, temperature, or other factors are accounted for because each air gun (after the first (n)) is fired based on feedback or data from the actual advancing wave as a result of the last air gun(s) firing.

In one embodiment, a synchronization unit such as the GPS system 1224 may receive feedback from the in-sea controller 1218 near the surface 1315 to synchronize the staggered array 1305 firing with the recording of the receivers (103, FIG. 24) in the borehole (102, FIG. 24). In one embodiment, the borehole receivers (103, FIG. 24) comprise Geophone Accelerometer (GAC) sensors from Schlumberger Technology Corporation, where the measured sensor response is flat to 3 Hz. Other receivers may also be used.

In one embodiment, air gun chamber volume for each individual air gun (n, n+1, n+2, etc.) is adjusted from one air gun to the next. Air gun chamber volume may be selected to compensate for variations in source signature output caused by increasing water pressure with depth. One of ordinary skill in the art having the benefit of this disclosure may select and change air gun chamber volume based on depth to optimize source signals.

The principles described herein may have application to all borehole seismic surveys and other application as well. The principles described herein provide high quality, consistent source signatures, even under varying sea surface conditions. Deep water or deep well exploration may benefit from the principles described herein. Using conventional apparatus and techniques, the seismic source signature can be compromised by the effects of attenuation and earth filtering. However, the principles and apparatus taught herein may overcome some of the weaknesses associated with conventional apparatus. Moreover, the principles described herein may have application to amplitude versus offset (AVO) analysis, where consistency of measured source signal is critical. The principles may also be useful for inversions and look-ahead analysis (prediction ahead of the borehole depth), where strong low frequency signature may be essential to the interpretation.

Some methods of using the source control system (1222, FIG. 24) or improving a VSP survey may further include measuring the air-gun (1106 in FIG. 24; n, n+1, etc. in FIG. 28) pressure directly at the source. The measurement of air-gun (1106 in FIG. 24; n, n+1, etc. in FIG. 28) pressure may be facilitated, for example, by the pressure sensor (1229, FIG. 24) of the in-sea sensor arrangement described above with reference to FIG. 24. The depth of the air-gun (1106 in FIG. 24; n, n+1, etc. in FIG. 28) may also be measured directly by the source. The measurement of air-gun (1106 in FIG. 24; n, n+1, etc. in FIG. 28) depth may be facilitated, for example, by a bathymetry sensor or other depth sensor (1227, FIG. 24) as described above. Some methods may also include integrating a firing of the air-gun (1106 in FIG. 24; n, n+1, etc. in FIG. 28) with a navigation system to facilitate air-gun (1106 in FIG. 24; n, n+1, etc. in FIG. 28) firing at either a precise time or a precise, absolute vertical position, both, or neither. Some of the advantages of firing the air-gun (1106 in FIG. 24; n, n+1, etc. in FIG. 28) or other seismic source only at precise, absolute, positions are described above.

The navigation system for facilitating air-gun (1106 in FIG. 24; n, n+1, etc. in FIG. 28) firing at certain vertical positions may be, for example, the GPS system (1224, FIGS. 24 and 28) discussed with reference to FIGS. 24 and 28, which receives and broadcasts precise position data. The GPS system (1224, FIGS. 24 and 28) may also receive and broadcast a time standard such as UTC. Accordingly, the air-gun (1106 in FIG. 24; n, n+1, etc. in FIG. 28) may be controlled according to time and position information received from the GPS system (1224, FIG. 24), and fired only at a certain, predetermined absolute height (e.g., fixed heights relative to receivers in a borehole) to reduce or eliminate time-shift errors. Further, as mentioned above, according to some methods, the firing of each air-gun (1106 in FIG. 24; n, n+1, etc. in FIG. 28) may be staggered in time and synchronized with downhole seismic receiver recording according to UTC time or another time standard. Indexing the data according to a time standard facilitates pre-sorting of the data for processing. Indexing the source performance and the receivers' recording according to a time standard also permits these data to be combined in the same dataset or file, thereby facilitating review, reporting, or data processing. Statistical quality control (QC) analysis of surface source performance and the borehole receiver (103, FIG. 24) performance may then be combined. In some cases, firing of the air-gun (1106 in FIG. 24; n, n+1, etc. in FIG. 28) may also be synchronized with surface seismic receiver recording. Accordingly, statistical quality control (QC) analysis could then be performed for the synchronized data set, including surface source signal, signals received by surface receivers, and signals received by borehole receivers.

According to some methods, a correction is made for source signature variations. Source signature variations may result, for example, from firing pressure air changes, temperature changes, rough seas, or tidal variations. The correction may include calibrating a near field sensor signal received by the hydrophone (1210, FIG. 24; 1306-1310, FIG. 28) located at the air-gun (1106 in FIG. 24; n, n+1, etc. in FIG. 28) or other seismic source, according to the fixed geometry of the air-gun (1106 in FIG. 24; n, n+1, etc. in FIG. 28) to the hydrophone (1210, FIG. 24; 1306-1310, FIG. 28). The hydrophone (1210, FIG. 24; 1306-1310, FIG. 28) may be part of the in-sea sensor package discussed above. The correction may further include reconstructing the far field signature of the air-gun (1106 in FIG. 24; n, n+1, etc. in FIG. 28) or other source from measured near field signature, and maintaining true amplitude for surface seismic calibrations, AVO surveys, and time-lapse surveys. In addition, corrections of the source signature may be made by comparing measured source signatures to a reference source signature, where the reference source signature is based on a seismic source reference far field signature on file at the well site.

We next consider offset surveys including fixed offset surveys and moving source surveys, which may include fixed marine platforms, buried air guns on land, land and marine vibrators, multi-sources, and multi-wells. A fixed offset survey includes a first seismic survey system, for example a fixed installation (such as a rig), and second remote seismic survey system (such as a boat) with an air gun or other seismic source. In a fixed offset borehole seismic survey operation, several shots (e.g. five) are fired to permit stacking at each shot position. Seismic data is collected by a wireline tool's receivers in a borehole at each of subsequent depths. In a VI-VSP, however, a boat moves from one station to another, but always remains directly vertical of the wireline tool. A VI-VSP can be combined with a Z-VSP to generate what is known as a flip-flop survey. To generate a flip-flop survey, one seismic source is deployed from the rig, and fires alternately with the second remote source. Fixed offset surveys may also include arrangements with two or more offset boats, each deploying a source and firing alternately.

A moving survey, for example a walkaway or 3D-VSP, is generated with the first seismic system or wireline tool with receivers in a borehole at a fixed position while the second remote seismic system moves. Usually only one shot is fired per target as the second remote seismic system moves. In the past, while synchronization of remote firing and data acquisition has been attempted, the results have been less than ideal. Therefore, according to principles described herein, seismic data acquisition is accurately synchronized with remote source firing based on universal timing available to both the first and second seismic systems. As used herein, synchronized data acquisition includes downhole data acquisition with at least one receiver deployed in a borehole and surface data acquisition, for example, with a near field receiver in the vicinity of the source.

Figure 29:
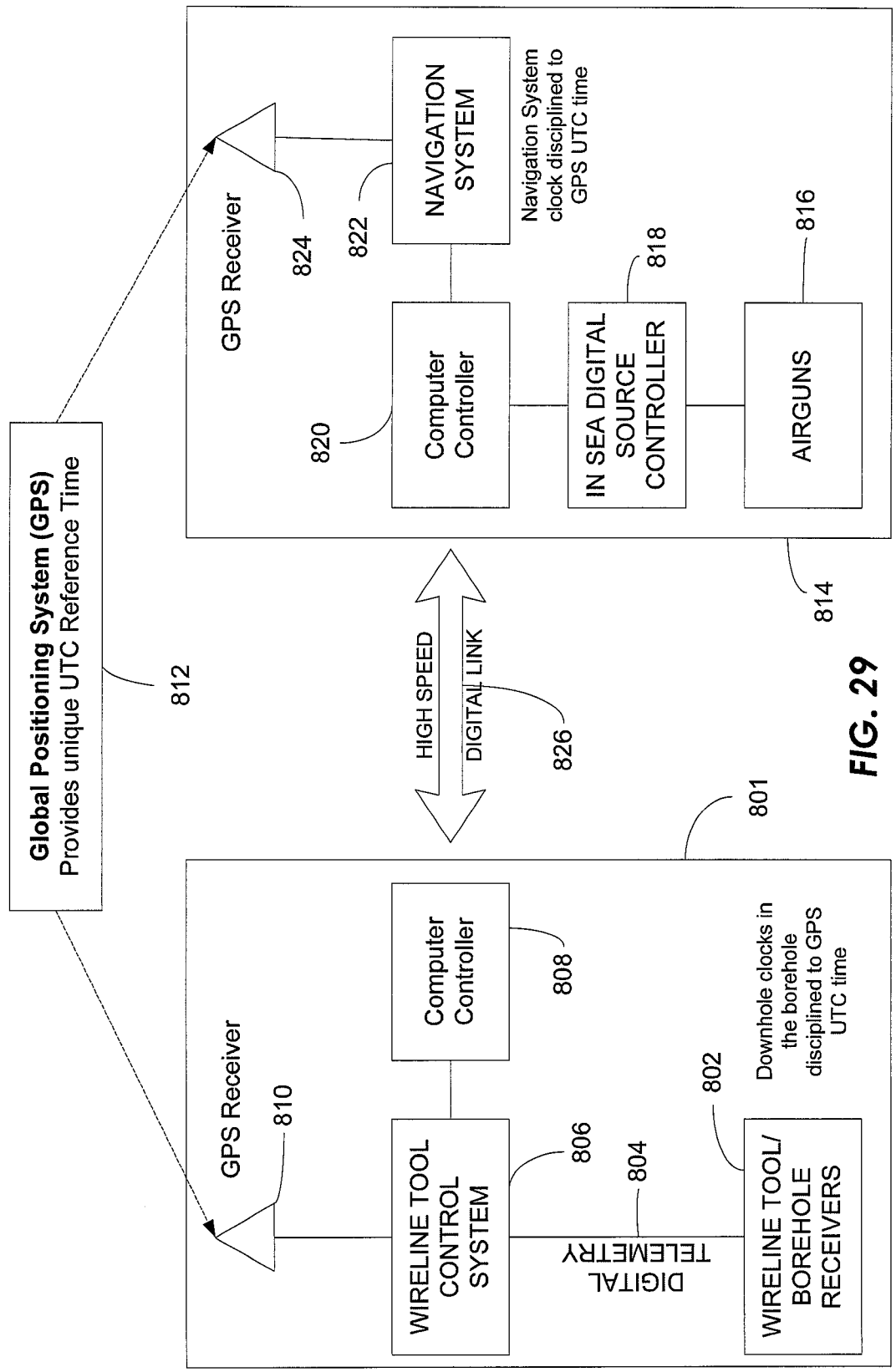
FIG. 29 is a schematic representation of a first seismic survey system and a remote second seismic survey system according to one embodiment.

One embodiment illustrated in FIG. 29 shows the first seismic survey system 801 which may include borehole receivers arranged on, for example, a wireline tool 802 (but receivers could also be permanent receivers, ocean bottom receivers, etc.). The first seismic survey system 801 may comprise a rig. The wireline tool 802 may communicate via a digital telemetry link 804 or optical link to a wireline tool control system 806 that may comprise a seismic recorder. The wireline tool control system 806 may comprise the MAXIS™ system available from Schlumberger and is coupled to a first computer controller 808 that provides the interface to the remote acquisition system 814 through the computer controller 820. The wireline tool control system 806 and/or the first computer controller 808 are also connected to a first satellite receiver such as a first GPS receiver 810. The GPS receiver 810 receives a universal time signal and position information from GPS satellites 812. The computer controller 808 may comprise the TRISOR™ system available from Schlumberger and may include a wireless, digital transceiver for sending and receiving digital information. This would correspond to a Z-VSP scenario or a flip/flop between a rig source and a remote source. The tool control system 808 may include a navigation system, which may, for example, provide quality control on the remote navigation system.

The embodiment of FIG. 29 also includes the second remote seismic survey system 814. As mentioned above, the second remote seismic survey system 814 may comprise, but not limited to, a boat. The second remote seismic survey system 814 is offset horizontally from first seismic survey system 801. The offset may be as far as several kilometers, which would make hard wiring between the first and second seismic systems 801, 814 difficult or impossible. The second remote seismic survey system 814 includes a seismic source such as airguns 816 that may be operated by a source controller 818. The source controller 818 may interface a second computer controller 820. The second computer controller may also or alternatively include a navigation system 822. The second remote seismic survey system 814 may include a second satellite receiver such as the second GPS receiver 824 connected to the navigation system 822 and/or the second computer controller 820. The second GPS receiver 824 also receives a universal time signal and position information from GPS satellites 812. The second computer controller 820 may also comprise a TRISOR™ system and the navigation system may comprise, for example, the SWINGS™ system available from Schlumberger. The second computer controller 820 may include a wireless, digital transceiver for sending and receiving digital information. Accordingly, a high speed, wireless, digital link 826 may provide communication between the first and second computer controllers 808, 820. The wireless digital link 826 may comprise an Ethernet radio (operating at, for example, 900 MHz) or a WLAN (operating at, for example, 2.4 GHz). A third or other addition remote seismic survey system similar or identical to the second remote seismic survey system 814 may also be added to some system embodiments.

According to the embodiment of FIG. 29, the first and second seismic survey systems 801, 814 are synchronized using the universal timing provided by the GPS 812. In some embodiments, the universal time is not GPS time but one of Meridian time, Glonas time, Galileo time, or other universal time standard that can be received by a satellite receiver. The source controller 818 and the wireline tool control system 806 of the tool 802 synchronize firing of the airguns 816 with downhole seismic data recording at a unique, universal-based time, referred to as a Time Break (TB) or Time Zero (T0).

The Time Break corresponds to a peak pressure at the center of the airguns 816, and also defines the start of downhole seismic data recording by the wireline tool control system 806. In some embodiments, the Time Break may comprise multiple times that are preset or preprogrammed. However, in some embodiments, especially those wherein the second remote seismic survey system 814 is moving and operating on target firing (slave mode), the Time Break corresponds to a computed time that the second remote seismic survey system 814 is expected to reach a target (e.g. based on a pre-established shooting plan, input into the navigation system 822). Walkaway and 3D VSPs are two examples of seismic surveys that may include one or more moving second remote seismic survey systems 814. Position, speed, and heading information based on GPS information at the second remote seismic survey system 814 may be communicated to the first seismic survey system 801, and the first or second seismic survey systems 801, 814 may calculate or predict the unique time (Time Break) at which the second remote seismic survey system 814 will reach the target (or a series of targets) based on a shooting plan. The second computer controller 820 may signal the calculated Time Break to the first computer controller 808, and which is communicated to the wireline tool control system 806. The first and second computer controllers 808, 826 may thus control and synchronize firing time and seismic data recording at one unique, universal time available to both the first and second seismic survey systems 801, 814. In some cases, the master computer controller 808 is programmed to send commands for synchronizing airgun 816 firing with seismic data recording according to a predefined delay, such as at least one second, or at least three seconds, in advance of the Time Break. Therefore, there will be plenty of time for the Time Break to be communicated to one of the computer controllers 808, 820 and prepare the airguns 816 for firing. It will be understood by those of ordinary skill in the art having the benefit of this disclosure that roles of the first and second computer controllers 808, 820 may be changed from master to slave depending on the operation, as discussed below.

In some embodiments, first and second computer controller 808, 820 firing sequence may require the wireline tool control system 806 to arm each installation (e.g. the navigation system 822 and the first and second computer controllers 808, 820) individually before starting a sequence of shots. This may be true, for example, when acquiring multiple shots for stacking purposes at a specific second remote seismic survey system 814 position, or when acquiring a complete walkway line. An arm command may include, among other things, a source ID to be armed, a fire mode (time or position), an initial shot number, and a minimum shot cycle.

In order to accommodate different seismic surveys, the first and second seismic survey systems 801, 814 may be operable in different modes. For example, for fixed offset, a master mode is used. In the master mode, the first computer controller 808 and/or the wireline tool control system 806 computes a future Time Break based on a universal time standard and transmits the same to the second remote seismic survey system 814. For walkway or 3D VSPs, a slave mode may be used wherein the navigation system 822 estimates the Time Break to reach a target, based on survey design, boat position, speed, and heading, and transmits the Time Break to the wireline tool control system 806. Another possibility is a slave mode with a fire window. This is similar to the slave mode, however, the navigation system 822 and/or the second computer controller 820 wait for notification from the wireline tool control system 806 after each shot. The slave with a fire window mode may be used to provide more accurate positioning for fixed offset surveys, while allowing some control over the fire sequence.

Figure 30:
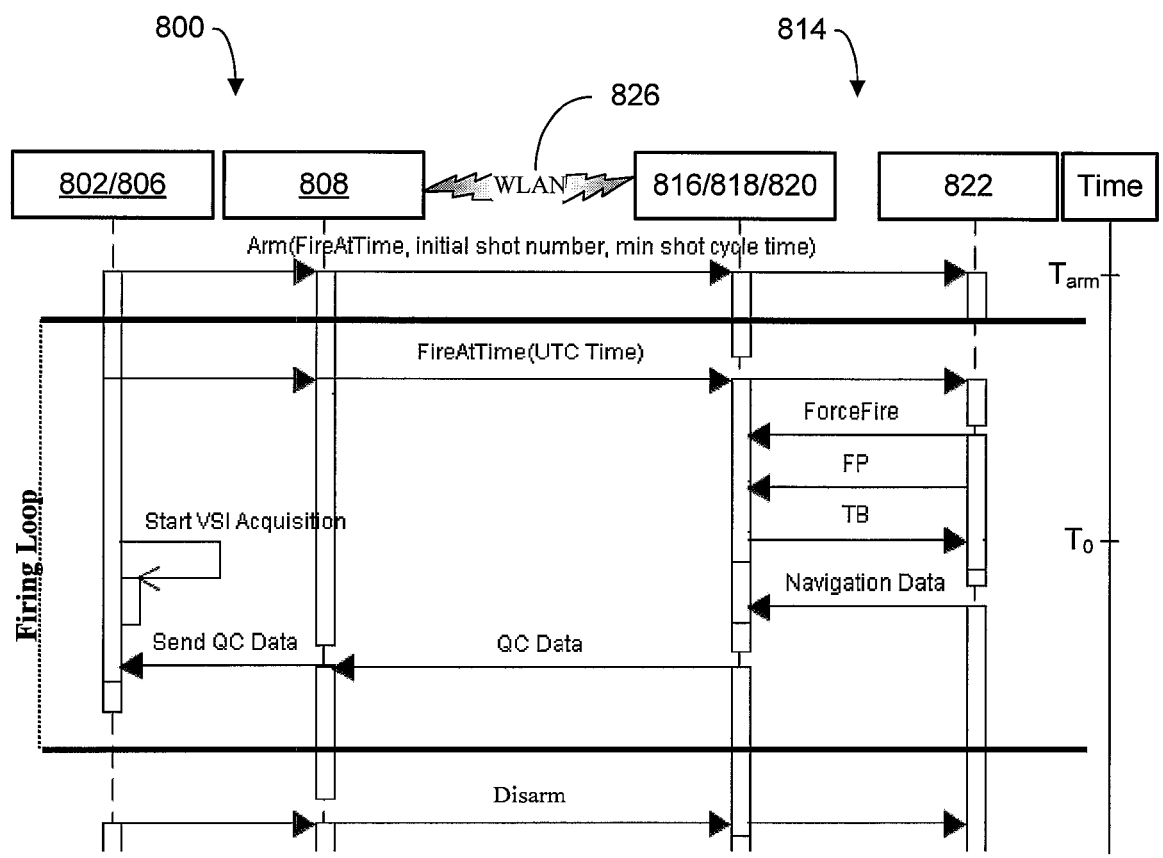
FIG. 30 is a sequence diagram illustrating timing and data flows of the system of FIG. 29 operating in the master mode.
Figure 31:
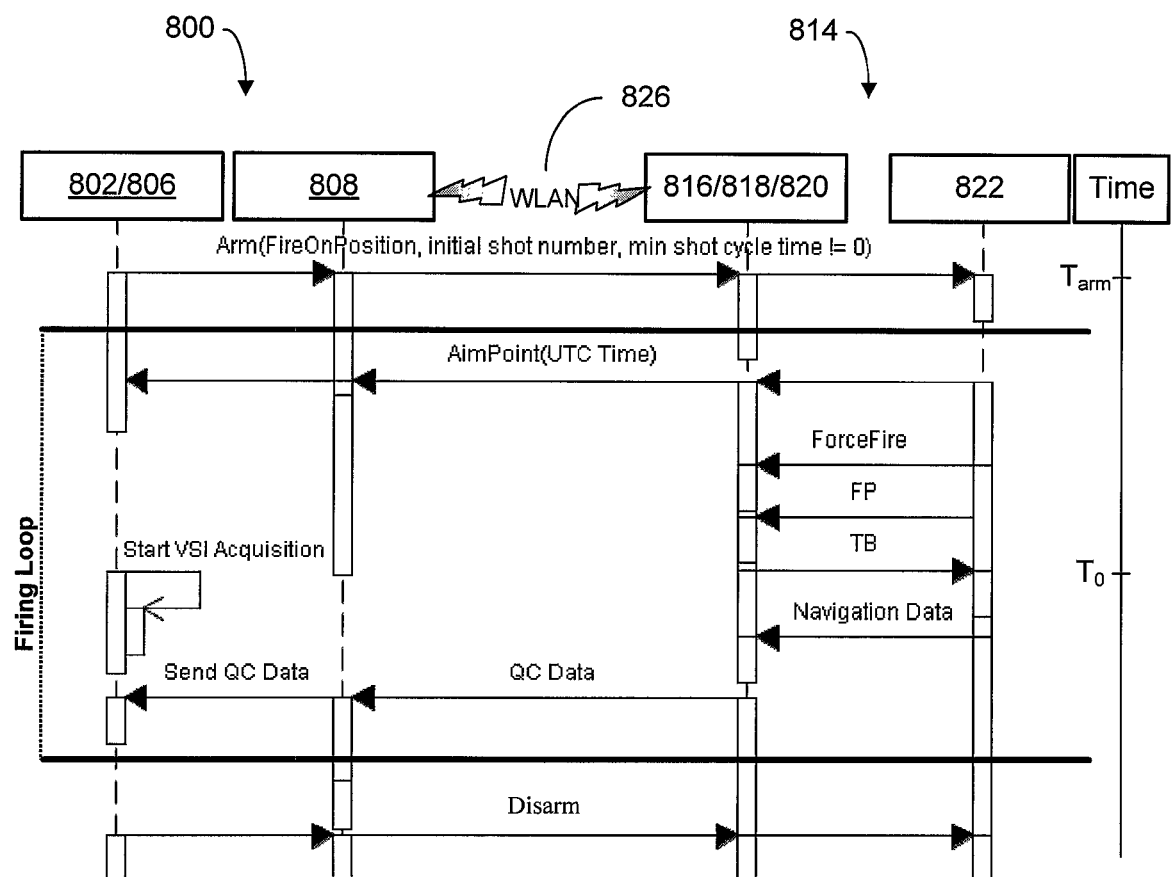
FIG. 31 is a sequence diagram illustrating timing and data flows of the system of FIG. 29 operating in the slave mode.
Figure 32:
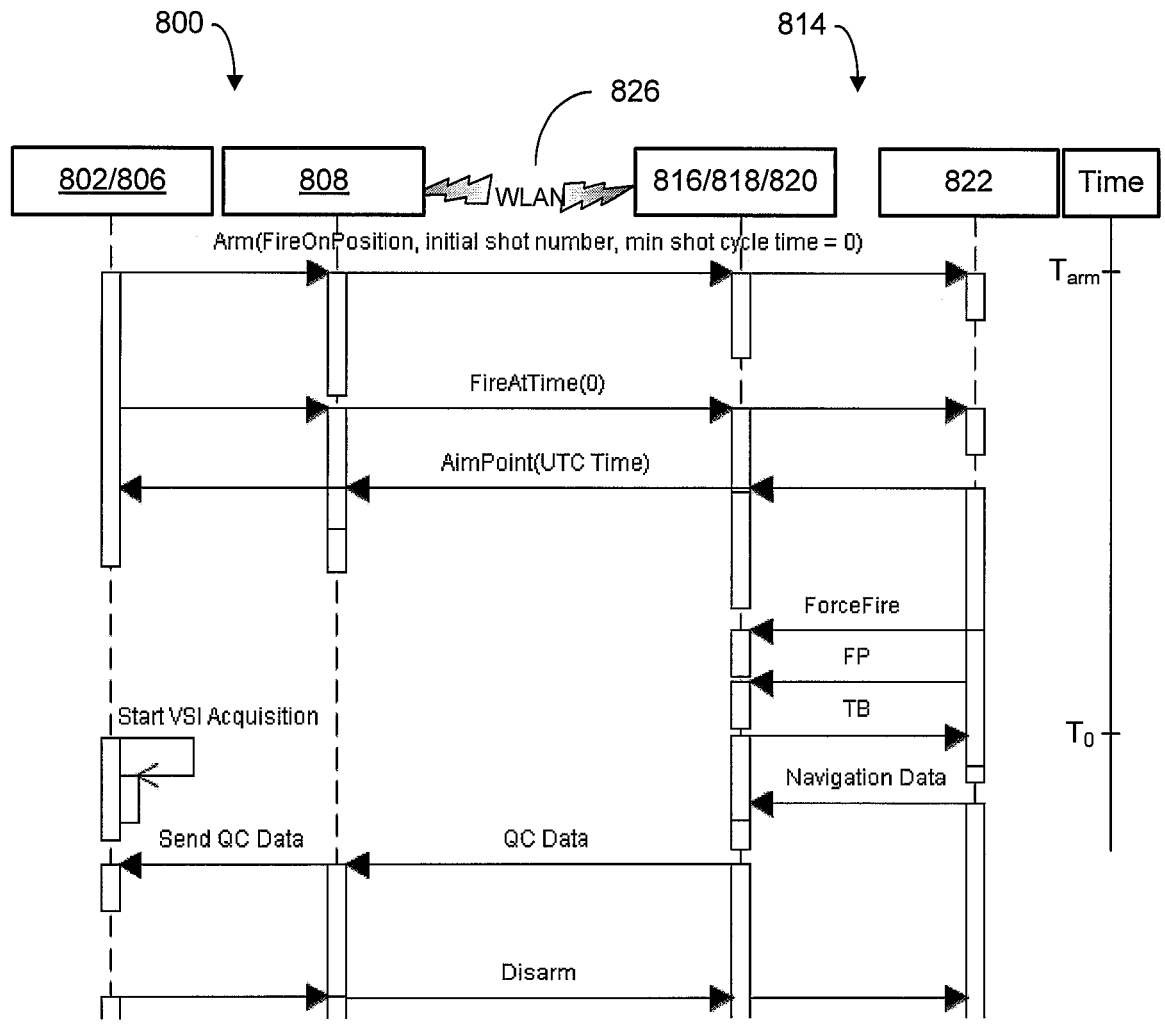
FIG. 32 is a sequence diagram illustrating timing and data flows of the system of FIG. 29 operating in the slave with fire window mode.

FIG. 30 is a sequence diagram illustrating timing and data flows of the system of FIG. 29 operating in the master mode. In FIGS. 30-32, time increases from top to bottom. In the master mode, offset-VSPs, VI-VSPs, and multi-offset VSPs can all be generated. The master mode is the simplest mode, as it leaves full freedom to a field engineer (who will generally be located on a rig, rather than at a source) to control the firing while minimizing constraints on the second remote seismic system 814. In the master mode, the first computer controller and/or the wireline tool control system 806 (e.g. MAXIS) directs which source is to fire, alternating between sources at the second remote seismic survey system 814 or between different locations. When the engineer begins firing, the wireline tool control system 806 arms the corresponding source, and sends a FireAtTime command to the navigation system 822 via the second computer controller 820, specifying the universal Time Break (TB or $T_0$) when firing (or peak pressure at the center of the airguns— which may be somewhat different but ascertainable from the firing time or the analog firing signal) should occur. The command may be sent according to a pre-defined delay, such as one to three seconds in advance of the Time Break to allow enough time for data transmission and source firing preparation.

FIG. 31 is a sequence diagram illustrating timing and data flows of the system of FIG. 29 operating in the slave mode. In the slave mode, walkaway and 3D-VSPs can be generated. The wireline tool control system 806 leaves the fire control up to the navigation system 822 in the slave mode. One the firing loop is started and the second remote seismic survey system 814 (e.g. boat) is on track, the operator does not need to trigger any firing and can focus on quality control. The navigation system 822 follows a pre-planned course or shooting plan (e.g. walkway line or spiral course) before reaching a target, and sends an AimPoint message to the wireline tool control system 806 through the first computer controller 808 specifying the Time Break (at which time downhole data will begin to be recorded) and the shot number to be fired. The shot number may be important, as the second computer controller 820 and/or the navigation system 822 (e.g. SWINGS system) is responsible for the fire sequence. In a flip/flop survey, the second computer controller 820 and/or the navigation system 822 increments the shot number based on which source if firing.

FIG. 32 is a sequence diagram illustrating timing and data flows of the system of FIG. 29 operating in the slave with fire window mode. This mode may enable, on-position firing for VI-VSPs. In the slave mode, and when initiating a firing loop, the wireline tool control system 806 does not have any control over the fire sequence. However, if the operator wants to quality control data shot by shot (manual shot rejection), he must stop the data acquisition after each shot. Therefore, the wireline tool control system 806 should regulate firing, even if the navigation system 822 and/or the second computer controller 820 perform a master function as it relates to source firing. Accordingly, in the embodiment of FIG. 32, the navigation system 822 and/or the second computer controller 820 wait for a confirmation from the wireline tool control system 806 before proceeding to a subsequent firing. That is, the wireline tool control system 806 sends an Arm command to the navigation system 822 (via the first and second computer controllers 808, 820) with the following parameters: OnPosition, and Shot Cycle Time 0. After a firing, the navigation system 822 switches to a waiting state. The wireline tool control system 806 then sends a FireAtTime command (with a 0 target time) to notify the navigation system 822 when it can proceed to the next shot. When the navigation system 822 is within a tolerance, it behaves as the slave (AimPoint).

Figure 33:
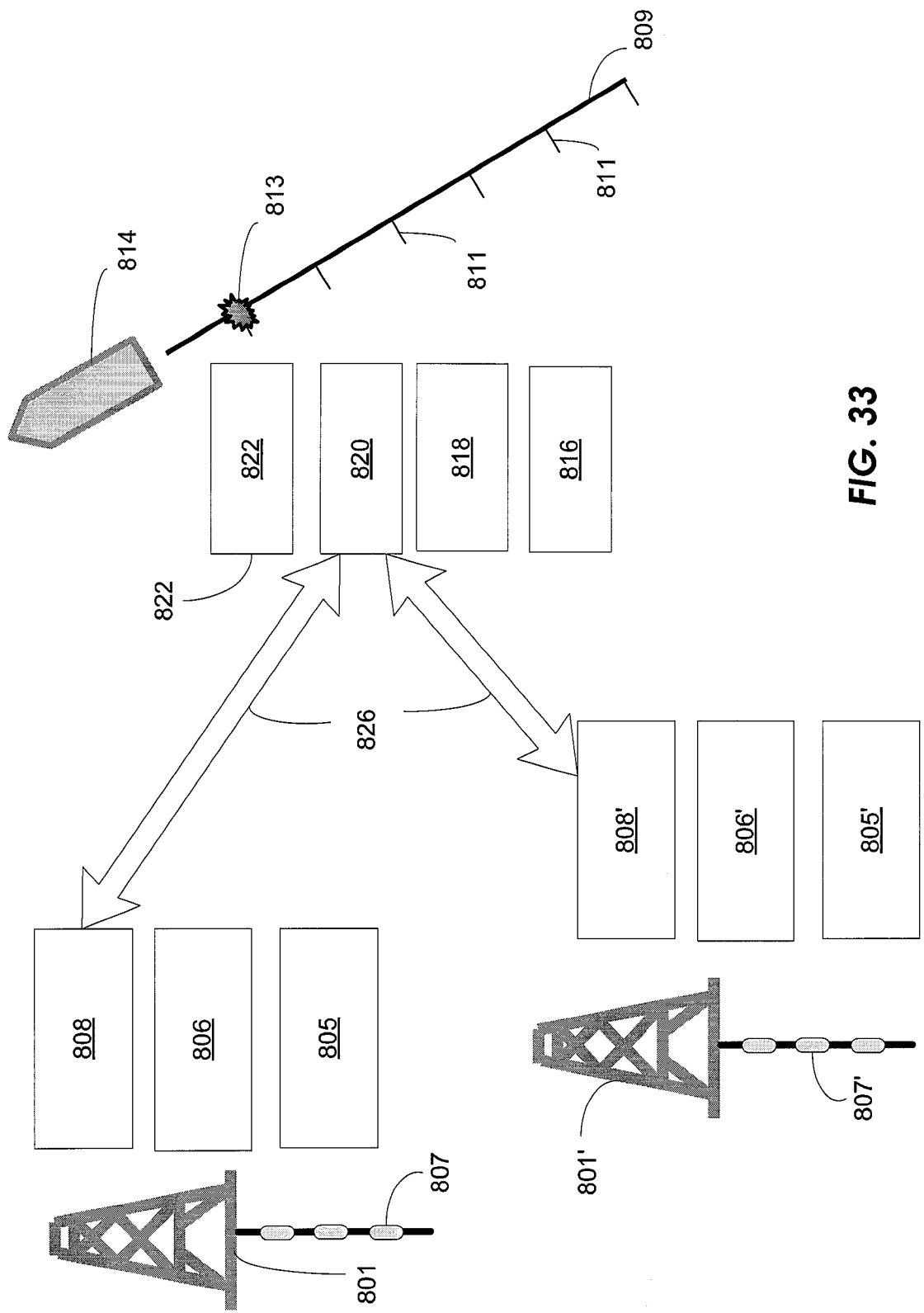
FIG. 33 is a schematic for a multi-well configuration according to one embodiment.

FIG. 33 illustrates one of many scenarios that may implement principles described herein. In the embodiment of FIG. 33, the first seismic system 801 comprises a first well including the computer controller 808, which is a first master computer controller in the embodiment of FIG. 33, the wireline tool control system 806, which may control the wireline tool 807, and first borehole receivers 805. The second seismic system 814 of FIG. 33 is a boat and follows a shooting plan 809, with each tick mark 811 corresponding to a firing. A current firing 813 is also shown. The second seismic system 814 includes the navigation system 822, the slave computer controller 820, the in sea source controller 818, and airguns 816. There is also a third seismic system 801', which comprises a second well including a second master computer controller 808', a second data acquisition and wireline tool control system 806' for the second wireline tool 807', and second borehole receivers 805'. The digital link 826 communicates between the first and second master computer controllers 808, 808', and the slave computer controller 820. The navigation system 822 and the digital link 826 communicate universal time signal and position information to each of the seismic systems, thus allowing synchronization of remote source firing from the boat with data acquisition at the two (or more) wells 801, 801'.

Figure 34:
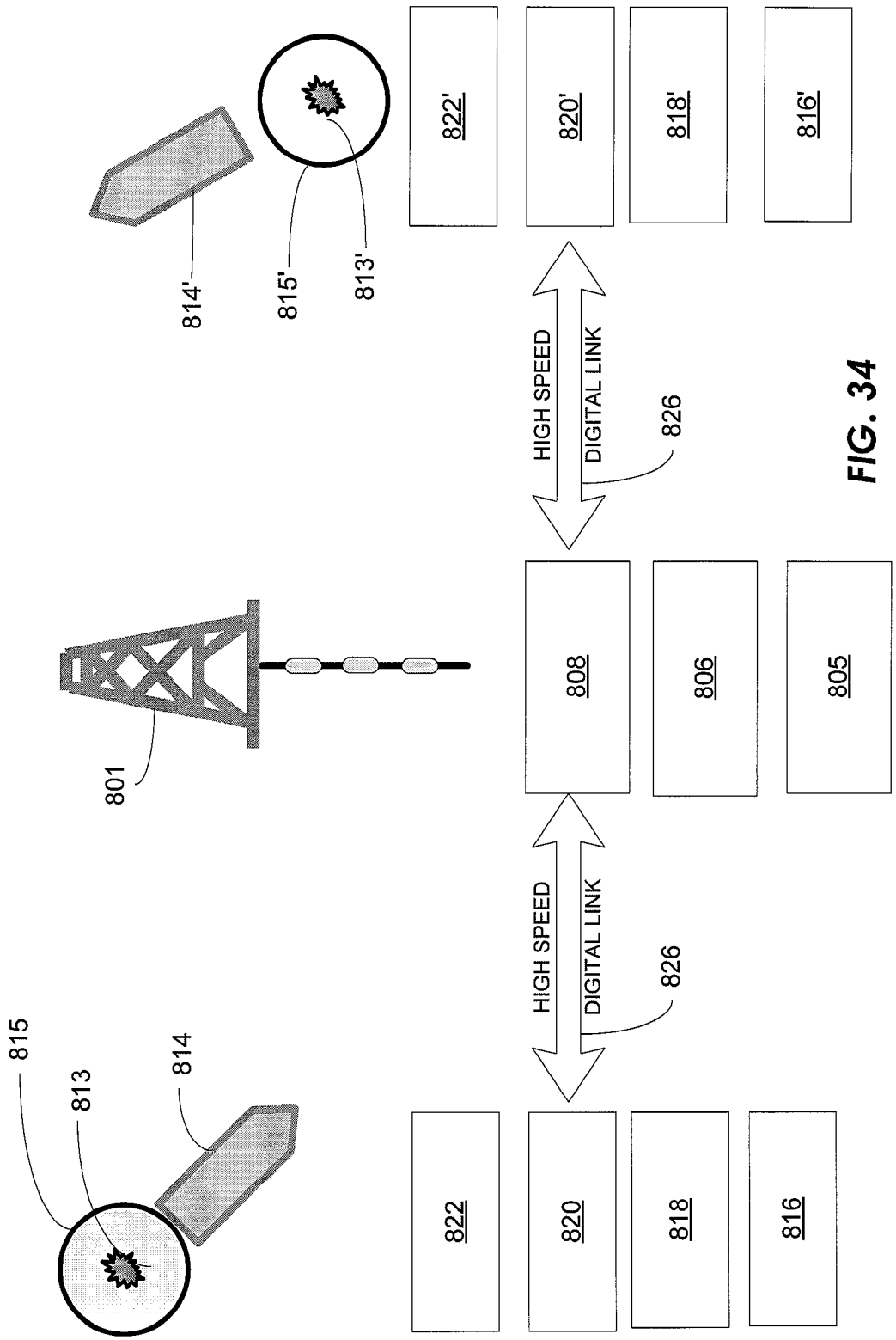
FIG. 34 is a schematic for a multi-source configuration according to one embodiment.

Similarly, another scenario is illustrated in FIG. 34. Rather than a multiple well scenario shown in FIG. 33, FIG. 34 shows a multi-source configuration. In the embodiment of FIG. 34, there are multiple moving remote sources. FIG. 34 illustrates the first seismic system 801 as a well including the master computer controller 808, the wireline tool control system 806, and the first borehole receivers 805. The second seismic system 814 of FIG. 34 is again a boat and fires 813 inside a target area 815. The second seismic system 814 includes the navigation system 822, the slave computer controller 820, the in sea source controller 818, and airguns 816. A third seismic system 814' of FIG. 34 is another boat and fires 813' inside another target area 815'. The third seismic system 814' includes a navigation system 822', the second slave computer controller 820', a second in sea source controller 818', and airguns 816'. The digital link 826 connects the first, second, and third seismic systems 801, 814, 814'. Again, a universal time signal and position information from the second and third seismic systems 814, 814' are communicated to the first seismic system 801, thus allowing synchronization of multiple remote source firing from the boats with data acquisition at the well. It will be appreciated by one of ordinary skill in the art having the benefit of this disclosure that the embodiments of FIGS. 33-34 may be expanded, with multiple sources and multiple wells.

Figure 35:
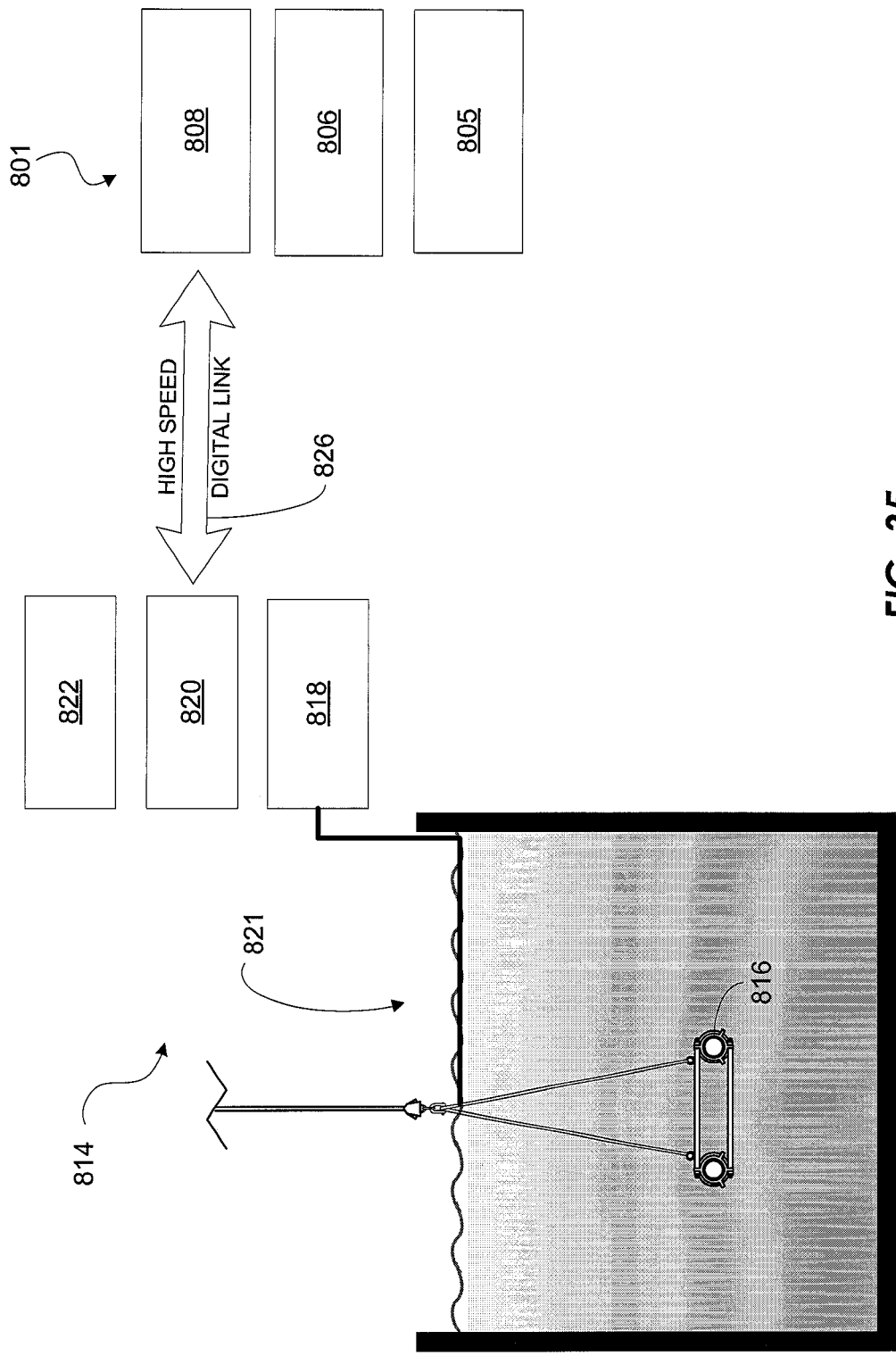
FIG. 35 is a schematic for a land based configuration according to one embodiment.

FIG. 35 illustrates a land configuration according to one embodiment using principles described herein. FIG. 35 illustrates the first seismic system 801 as a land-based well including the master computer controller 808, the wireline tool control system 806, and the first borehole receivers 805. The second seismic system 814 comprises a land system including airguns 816 suspended from a crane 823 that are deployed in a land pit 821 filled with water. The second seismic system 814 includes the navigation system 822, the slave computer controller 820, and the source controller 818. Again, a universal time signal and position information from the second seismic system 814 is communicated to the first seismic system 801, thus allowing synchronization of remote source firing from the airguns 816 with data acquisition at the well.

Although the above described embodiments are in the context of seismic surveys, the techniques described herein are also applicable to electromagnetic measurements and logging-while-drilling (LWD) survey systems, where the source is located, for example, at the surface and horizontally offset from the downhole recording system in the borehole. In this, electromagnetic induction (EMI) formation characterization systems that are known in the art may be utilized based on the principles described herein for purposes of borehole surveys, in which the electromagnetic source is remotely deployed from the borehole. Similarly, survey systems in logging-while-drilling (LWD) environments with, for example, wired drill pipe telemetry, may be utilized based on the principles herein for purposes of LWD offset surveys utilizing a seismic source.

The survey systems herein may comprise one or more of a wireline tool, a LWD tool, tools deployed by tubing such as production tubing and coiled tubing, and sensors such as geophones cemented behind borehole casing.

The preceding description has been presented only to illustrate and describe certain embodiments. It is not intended to be exhaustive or to limit the invention to any precise form disclosed. Many modifications and variations are possible in light of the above teaching.

The embodiments and aspects were chosen and described in order to best explain the principles of the invention and its practical application. The preceding description is intended to enable others skilled in the art to best utilize the principles in various embodiments and aspects and with various modifications as are suited to the particular use contemplated. It is intended that the scope of the invention be defined by the following claims.

What is claimed is:

1. A method for conducting a borehole seismic survey with one or more seismic receivers deployed in a borehole using a first seismic survey system and a second remote seismic survey system, comprising:
    providing a first satellite receiver at the first seismic survey system and a second satellite receiver at the second remote seismic survey system;
    receiving a universal time signal by each of the first and second satellite receivers;
    choosing a unique time break based on the universal time signal;
    communicating the unique time break to an acquisition control system of the first seismic survey system and a source control system of the second remote seismic survey system; and
    synchronizing source firing of the second remote seismic survey system with the recording of seismic data from the one or more receivers deployed in the borehole at the time break based on the universal time signal,
    wherein the second remote seismic survey system comprises: a first seismic source; a second seismic source spaced vertically from the first seismic source; and a first seismic sensor at the second seismic source; and
    wherein the source control system is operatively connected to the first and second seismic sources and the first seismic sensor and programmed to fire the first seismic source and dynamically adjust a firing time of the second seismic source based on feedback from the first seismic sensor in a single sequence of firing.

2. A method according to claim 1, wherein the unique time break is pre-programmed.

3. A method according to claim 1, wherein the first and second satellite receivers comprise GPS receivers, and further comprising:
    monitoring position and course of the second remote seismic survey system; and
    communicating position and course of the second remote seismic survey system to the first seismic survey system via a digital wireless link;
    wherein choosing the unique time break comprises predicting the time break for a target of the second remote seismic survey system based on the course of the second remote seismic survey system.

4. A method according to claim 1, further comprising sending commands for firing and recording seismic data at the time break at a predetermined time in advance of the time break.

5. A method according to claim 1, wherein the recorded data comprises data recorded by the one or more borehole receivers and data recorded by at least one near field receiver deployed in the vicinity of the first or second seismic source or both.

6. A method according to claim 1, wherein the first and second satellite receivers comprise GPS receivers, and further comprising:
    monitoring position and course of the second remote seismic survey system; and
    communicating position and course of the second remote seismic survey system to the first seismic survey system via a digital wireless link;
    wherein choosing the unique time break comprises predicting multiple time breaks for targets of the second remote seismic survey system based on the course of the second remote seismic survey system and a shooting plan.

7. A method according to claim 1, wherein the first and second satellite receivers comprise GPS receivers, and further comprising:
    providing a third remote seismic survey system having a third GPS receiver;
    monitoring position and course of the second and third remote seismic survey systems; and
    communicating position and course of the second and third remote seismic survey systems to the first seismic survey system via a digital wireless link;
    wherein choosing the unique time break comprises predicting multiple time breaks for targets of the second and third remote seismic survey systems based on the courses of the second and third remote seismic survey systems and a shooting plan.

8. A method according to claim 1, wherein the borehole seismic survey comprises one of a walkway and a 3D VSP.

9. A method according to claim 1, wherein the universal time comprises one of: GPS time, Meridian time, Glonas time, and Galileo time.

10. An apparatus, comprising:
    a first seismic survey system, the first seismic survey system comprising:
        at least one borehole receiver;
        a seismic recorder operatively connected to the at least one borehole receiver;
        a first computer controller controlling seismic acquisition recording time;
        a first GPS receiver;
    a second remote seismic survey system offset horizontally from the first seismic survey system, the second remote seismic survey system comprising:
        a first seismic source;
        a second seismic source spaced vertically from the first seismic source;
        a first seismic sensor at the second seismic source;
        a second GPS receiver;
        a second computer controller controlling firing of the first seismic source; and a wireless, digital link between the first and second seismic survey systems;
        wherein the first and second controllers are programmed to synchronize firing of the first seismic source with recording of seismic data from the seismic recorder at a time break based on a universal time available to both the first and second GPS receivers, and the second controller is also operatively connected to the first and second seismic sources and the first seismic sensor, wherein the second controller is programmed to dynamically adjust a firing time of the second seismic source based on feedback from the first seismic sensor in a single sequence of firing.

11. The apparatus according to claim 10, wherein the seismic recorder comprises a wireline tool.

12. The apparatus according to claim 10, wherein the seismic recorder comprises a tool deployed by tubing.

13. The apparatus according to claim 10, wherein the at least one borehole receiver comprises one or more receivers cemented behind borehole casing.

14. The apparatus according to claim 10, wherein the first and second controllers are programmed to synchronize firing of the first seismic source with recording of seismic data by one or more borehole receivers and by at least one near field receiver deployed in the vicinity of the first or second seismic source or both.

15. The apparatus according to claim 10, wherein the second remote seismic survey system comprises a boat.

16. The apparatus according to claim 10, wherein the second remote seismic survey system comprises a navigation system, and wherein the time break comprises multiple time breaks predicted by the navigation system for targets of the second remote seismic survey system based on the course of the second seismic survey system and a shooting plan.

17. The apparatus according to claim 10, further comprising programming that sends commands for synchronized first seismic source firing and recording seismic data at the time break at a predetermined time in advance of the time break.

18. A method of seismic surveying using a first seismic survey system and a second remote seismic survey system, wherein the second remote seismic survey system includes a first seismic source, a second seismic source spaced vertically from the first seismic source, a first seismic sensor at the second seismic source, and a controller operatively connected to the first and second seismic sources and the first seismic sensor, the method comprising:
providing at least one receiver deployed in a borehole and configured to receive seismic waves generated by the first seismic source of the second remote seismic survey system;
receiving at the first and second seismic survey systems a universal time;
using a GPS system to predict a time break, based on the universal time, that the second remote seismic survey system will be located at a target;
communicating the time break between the first and second seismic survey systems;
using the controller to dynamically adjust a firing time of the second seismic source based on feedback from the first seismic sensor in a single sequence of firing, synchronizing firing of the first seismic source at the target with recording of seismic waves received by the at least one receiver deployed in the borehole; and
generating a VSP from the seismic waves received by at least one receiver deployed in the borehole.

19. A method according to claim 18, further comprising synchronizing firing of the first seismic source at the target with recording of seismic waves received by at least one near field receiver deployed in the vicinity of the first seismic source.

20. A method of seismic surveying using a first seismic survey system and a second remote seismic survey system, wherein the second remote seismic survey system includes a first seismic source, a second seismic source spaced vertically from the first seismic source, a first seismic sensor at the second seismic source, and a controller operatively connected to the first and second seismic sources and the first seismic sensor, the method comprising:
providing at least one receiver deployed in a borehole and configured to receive seismic waves generated by the first seismic source of the second remote seismic survey system;
receiving at the first and second seismic survey systems a universal time;
communicating a time break between the first and second seismic survey systems, the time break based on the universal time; and
at the time break, synchronizing the firing of the first seismic source with recording of seismic waves received by the at least one receiver deployed in the borehole, wherein the controller dynamically adjusts a firing time of the second seismic source based on feedback from the first seismic sensor in a single sequence of firing.

21. A method according to claim 20, further comprising:
displaying at the first seismic survey system a location and course of the second remote seismic survey system; and
using a GPS system to predict the time break, based on the universal time, that the second remote seismic survey system will be located at a target;
wherein the synchronizing comprises synchronizing firing of the first seismic source at the target with recording of seismic waves received by the at least one receiver deployed in the borehole.

22. The method according to claim 21, further comprising synchronizing firing of the first seismic source at the target with recording of the seismic waves received by at least one near field receiver deployed in the vicinity of the first or second seismic source or both.

23. A method according to claim 20, further comprising communicating the time break between the first and second seismic survey systems via a wireless digital link.

24. A method according to claim 20, further comprising generating a VSP from the recorded seismic waves.

* * * * *